United States Patent
Ogasawara et al.

(10) Patent No.: US 10,604,633 B2
(45) Date of Patent: Mar. 31, 2020

(54) THERMOPLASTIC PREPREG AND LAMINATE

(71) Applicant: Mitsubishi Chemical Corporation, Tokyo (JP)

(72) Inventors: Hayato Ogasawara, Toyohashi (JP); Masahiko Nagasaka, Toyohashi (JP); Yasuhiko Nabeshima, Toyohashi (JP); Takeshi Ishikawa, Toyohashi (JP); Akinobu Sasaki, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 611 days.

(21) Appl. No.: 14/915,866

(22) PCT Filed: Sep. 9, 2014

(86) PCT No.: PCT/JP2014/073757
§ 371 (c)(1),
(2) Date: Mar. 1, 2016

(87) PCT Pub. No.: WO2015/037570
PCT Pub. Date: Mar. 19, 2015

(65) Prior Publication Data
US 2016/0194468 A1    Jul. 7, 2016

(30) Foreign Application Priority Data
Sep. 10, 2013   (JP) .................................. 2013-187062

(51) Int. Cl.
*B32B 3/24* (2006.01)
*C08J 5/24* (2006.01)
*C08J 5/04* (2006.01)

(52) U.S. Cl.
CPC ............... *C08J 5/24* (2013.01); *C08J 5/042* (2013.01); *C08J 2323/14* (2013.01);
(Continued)

(58) Field of Classification Search
CPC .......................... Y10T 428/24314; C08J 5/24
See application file for complete search history.

(56) References Cited

FOREIGN PATENT DOCUMENTS

| JP | 58-201614 A | 11/1983 |
|---|---|---|
| JP | 7-156145 A | 6/1995 |

(Continued)

OTHER PUBLICATIONS

International Search Report dated Dec. 16, 2014 in PCT/JP2014/073757 filed on Sep. 9, 2014.
(Continued)

*Primary Examiner* — William P Watkins, III
(74) *Attorney, Agent, or Firm* — Oblon, McClelland, Maier & Neustadt, L.L.P.

(57) ABSTRACT

A prepreg formed from a resin and unidirectionally aligned reinforcement fibers, characterized in that: the prepreg is sheet-shaped; the prepreg has cutouts of a depth for cutting the reinforcement fibers, and includes reinforcement fibers (A) cut by the cutouts to a length of 10 to 50 mm and reinforcement fibers (B) having a length of equal to or more than 50% of the sheet length of the prepreg in the alignment direction of the reinforcement fibers; the surface area of a band section including the reinforcement fibers (B) in a plan view is 1.4% to 35.0% of the entire surface area of the prepreg in a plan view; and at least one end of the reinforcement fibers (B) is positioned at an end portion of the prepreg in the alignment direction of the reinforcement fibers.

16 Claims, 3 Drawing Sheets

(52) U.S. Cl.
CPC ........ *C08J 2323/26* (2013.01); *C08J 2377/02* (2013.01); *Y10T 428/24314* (2015.01)

(56) References Cited

FOREIGN PATENT DOCUMENTS

| | | |
|---|---|---|
| JP | 7-164439 A | 6/1995 |
| JP | 2008-254425 A | 10/2008 |
| JP | 2008-260793 A | 10/2008 |
| JP | 2008-279753 A | 11/2008 |
| JP | 2009-220480 A | 10/2009 |
| JP | 2009-537691 A | 10/2009 |
| JP | 2009-286817 A | 12/2009 |
| JP | 2011-202303 A | 10/2011 |
| WO | WO 2007/135418 A1 | 11/2007 |

OTHER PUBLICATIONS

Notice of Allowance dated Nov. 17, 2015 in Japanese Patent Application No. 2014-546236 (with English language translation).
Notice of Reasons for Cancellation dated Oct. 13, 2016 in Japanese Patent Application No. 2014-546236 (with English translation).
Office Action dated Mar. 27, 2019 in corresponding Indian Patent Application No. 201647006646, 5 pages.

THERMOPLASTIC PREPREG AND LAMINATE

TECHNICAL FIELD

The present invention relates to a thermoplastic prepreg having excellent dimensional stability at the time of preheating for stamping molding and having excellent shapeability into a complicated shape, and a laminate thereof. More particularly, the invention relates to a thermoplastic prepreg which suppresses draw-down at the time of preheating and is capable of easily conforming to a three-dimensional shape such as a rib or a boss, and to a laminate thereof.

Priority is claimed on Japanese Patent Application No. 2013-187062 filed in Japan on Sep. 10, 2013, the content of which is incorporated herein by reference.

BACKGROUND ART

Regarding a method for molding a fiber-reinforced thermoplastic plastic, stamping molding, by which a laminated base material that is obtainable by laminating a prepreg produced by impregnating continuous reinforcement fibers with a thermoplastic resin, is preheated or heated and pressurized with a press machine or the like, and thereby the laminated base material is shaped into a desired shape, is most commonly carried out. A fiber-reinforced plastic obtained thereby has excellent mechanical properties because continuous reinforcement fibers are used. Furthermore, a fiber-reinforced plastic can be designed to have required mechanical properties, by aligning the continuous reinforcement fibers in a regular fashion. However, since the reinforcement fibers are continuous reinforcement fibers, it is difficult to form a complicated shape such as a three-dimensional shape with the continuous reinforcement fibers, and the shape is mostly limited to members having shapes close to a planar shape.

In order to solve this problem, there have been disclosed a laminated base material having excellent stamping moldability, which is obtainable by dispersing, on a plane, chopped prepregs that are produced by cutting tape-like prepregs having a narrow width to a constant length; and a laminated base material which is considered to exhibit excellent shapeability at the time of molding and excellent mechanical properties after shaping, the laminated base material being obtainable by inserting incision into a prepreg formed from continuous fibers and a thermoplastic resin (for example, Patent Documents 1 and 2).

However, the laminated base materials described in Patent Documents 1 and 2 have a problem that at the time of conveyance after a preheating process during stamping molding, heat sagging (that is, draw-down) of the laminated base material occurs, which is attributable to the fact that the reinforcement fibers are non-continuous, and this heat sagging causes shape change or acceleration of the cooling rate.

As described above, from the viewpoint that a laminated base material undergoes draw-down at the time of preheating or heating, there has been suggested a laminated base material in which a skin material having a high softening temperature is provided in the skin layer of the laminated base material, while a conventionally known fiber-reinforced layer is provided in the core layer (for example, Patent Document 3). However, when a resin layer having a high softening temperature is provided as the skin material, there is a problem that although draw-down at the time of preheating can be suppressed, the skin material inhibits the flow of the reinforcement fibers and the resin at the time of stamping molding, and molding of a three-dimensional shape such as a rib or a boss is significantly deteriorated.

CITATION LIST

Patent Document

Patent Document 1: JP 07-164439 A
Patent Document 2: JP 2009-286817 A
Patent Document 3: JP 07-156145 A

SUMMARY OF THE INVENTION

Problem to be Solved by the Invention

The present invention is intended to solve the problems associated with the prior art technologies such as described above, and it is an object of the present invention to provide a prepreg which suppresses draw-down at the time of preheating for stamping molding, has excellent handleability, and has excellent moldability into a complicated shape, and to provide a laminated base material thereof.

Means for Solving Problem

The inventors of the present invention conducted a thorough investigation in order to solve the problems described above, and as a result, the inventors found that the problems can be solved by incorporating, into a sheet-like prepreg, reinforcement fibers having a length equivalent to 50% or more of the sheet length of the prepreg in the alignment direction of the reinforcement fibers. Thus, the inventors completed the present invention. That is, the gist of the invention lies in the following items (1) to (17).

(1) A prepreg including a resin and unidirectionally aligned reinforcement fibers,
the prepreg being sheet-shaped, and
the prepreg having slits with a depth that cuts off the reinforcement fibers, and including reinforcement fibers A that are cut by the slits to a length of 10 to 50 mm; and reinforcement fibers B having a length equivalent to 50% or more of the sheet length of the prepreg in the alignment direction of the reinforcement fibers,
wherein the surface area in a plan view of a band section containing the reinforcement fibers B is 1.4% to 35.0% of the total surface area in a plan view of the prepreg, and
at least one end of the reinforcement fibers B is positioned at an edge of the prepreg in the alignment direction of the reinforcement fibers.

(2) The prepreg according to item (1), wherein band sections formed from the reinforcement fibers A cut by the slits, and band sections containing the reinforcement fibers B are alternately arranged.

(3) The prepreg according to item (1), wherein band sections formed from the reinforcement fibers A cut by the slits, and band sections containing the reinforcement fibers B are alternately arranged over the entire surface of the prepreg.

(4) The prepreg according to any one of items (1) to (3), wherein a band section containing the reinforcement fibers B is disposed between one band section and another band section, both being formed from the reinforcement fibers A cut by the slits.

(5) The prepreg according to any one of items (1) to (4), wherein the width Wn of a band section containing the reinforcement fibers B is from 0.5 mm to 10.0 mm, and the distance Wp between one band section and another band section, both containing the reinforcement fibers B, is from 5 mm to 150 mm.

(6) The prepreg according to any one of items (1) to (5), wherein the widths Wn of the band sections containing the reinforcement fibers B are all of the same length.

(7) The prepreg according to any one of items (1) to (6), wherein the reinforcement fibers B are reinforcement fibers that are not cut off over the length from one side to the other side of the prepreg.

(8) The prepreg according to any one of items (1) to (7), wherein one side of the prepreg is parallel to the alignment direction of the reinforcement fibers.

(9) The prepreg according to any one of items (1) to (8), wherein the sum total of the cutting lengths formed by the slits in a surface area in a plan view of 1 m² of the prepreg, is from 20 m to 150 m.

(10) The prepreg according to any one of items (1) to (9), wherein the angle formed by the slits and the reinforcement fibers is from 30° to 60°.

(11) The prepreg according to any one of items (1) to (10), wherein the thickness is from 50 μm to 200 μm.

(12) The prepreg according to any one of items (1) to (11), wherein the reinforcement fibers are carbon fibers.

(13) The prepreg according to any one of items (1) to (12), wherein the resin that forms the prepreg is a thermoplastic resin.

(14) The prepreg according to any one of items (1) to (13), wherein at least one side of the prepreg is 500 mm to 2000 mm in length.

(15) A laminated base material formed by laminating plural sheets of prepregs, the laminated base material including at least one sheet of the prepreg according to any one of items (1) to (14).

(16) The laminated base material according to claim 15, further including at least one layer which is formed from a thermoplastic resin and does not contain the reinforcement fibers.

(17) The laminated base material according to item (15) or (16), wherein the volume fraction of the reinforcement fibers included in the laminated base material is from 15% by volume to 55% by volume relative to the total volume of the laminated base material.

(18) A molded article obtained by molding the laminated base material according to any one of items (15) to (17) through heating and pressurization.

Effect of the Invention

The present invention is intended to solve the problems associated with the prior art technologies such as described above. The invention can provide a prepreg which suppresses draw-down at the time of preheating during stamping molding, has excellent handleability, and has excellent moldability into a complicated shape, and can provide a laminated base material thereof.

MODE(S) FOR CARRYING OUT THE INVENTION

Figure 1:
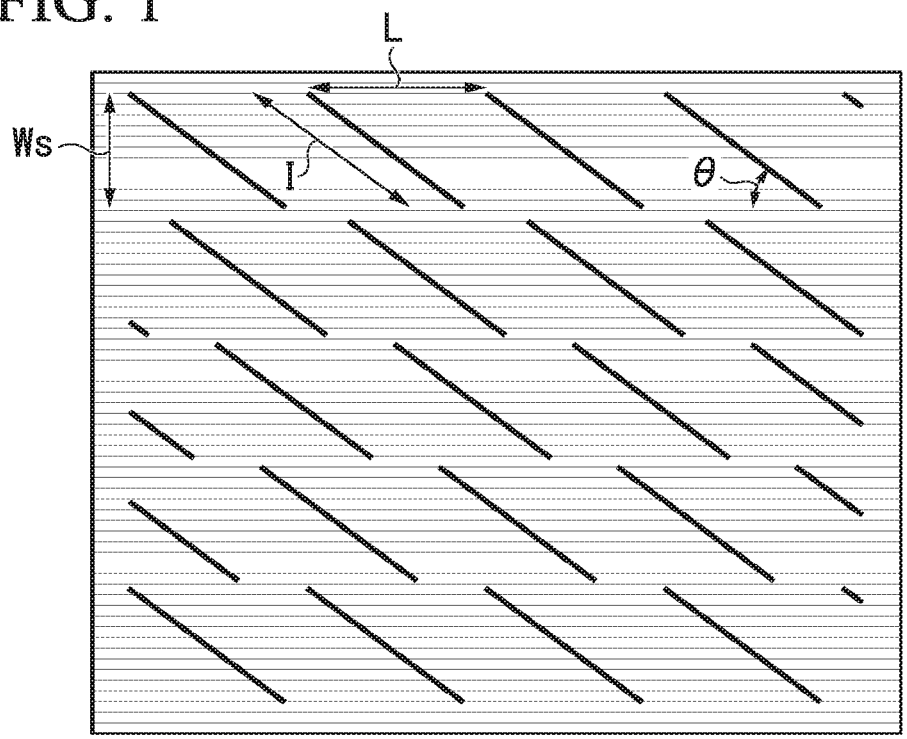
FIG. 1 is a diagram illustrating a conventional prepreg (corresponding to the prepreg of Comparative Examples 2 and 3)

Hereinafter, the present invention will be described using the drawings (the reference numerals or the symbols described below are symbols described in the diagrams).

The present invention relates to a prepreg formed from unidirectionally aligned reinforcement fibers and a resin, the prepreg being sheet-shaped, and the prepreg having slits 1 that cut off the reinforcement fibers and including reinforcement fibers A cut to a length of 10 to 50 mm by the slits; and reinforcement fibers B having a length equivalent to 50% or more of the sheet length of the prepreg in the alignment direction of the reinforcement fibers, in which the surface area in a plan view of a band section 2 containing the reinforcement fibers B is 1.4% to 35.0% of the total surface area in a plan view of the prepreg, and at least one end of the reinforcement fibers B is positioned at an edge in the sheet length direction of the prepreg (that is, an edge of the prepreg in the alignment direction of the reinforcement fibers), and to a laminated base material including the prepreg.

The term "band section formed from reinforcement fibers A" means a region formed from reinforcement fibers A only in a sheet-shaped prepreg, the region extending from an edge to the other edge of the prepreg in the alignment direction of the reinforcement fibers. However, if necessary, an edge of the "band section formed from reinforcement fibers A" may have an ear section formed on the inner side of the edge.

The term "band section containing reinforcement fibers B" means a region containing reinforcement fibers B in a sheet-shaped prepreg, the region extending from an edge to the other edge of the prepreg in the alignment direction of the reinforcement fibers.

The term "depth that cuts off the reinforcement fibers" means a depth that cuts from the upper surface to the lower surface of the sheet.

The term "a plan view" means viewing the plane surface of a sheet-shaped prepreg in a normal direction.

The term "unidirectionally aligned reinforcement fibers" refers to that the reinforcement fibers included in a prepreg are arranged almost in parallel with the longitudinal direction of the reinforcement fibers. When it is said that "the reinforcement fibers included in a prepreg are almost parallel," this implies that 90% or more of the reinforcement fibers included in the prepreg are within the range of −5° to +5° with respect to the longitudinal direction, preferably 95% or more of the reinforcement fibers are within the range of −2° to +2° with respect to the longitudinal direction, and more preferably 95% or more of the reinforcement fibers are within the range of −1° to +1°.

According to an aspect of the present embodiment, particularly in regard to the method for producing a prepreg, it is preferable that tension is applied to fiber bundles obtained by gathering fibers, and thereby the directions are almost aligned (this state is also referred to as that the fibers are unidirectionally paralleled). One side of a sheet-shaped prepreg obtained in this manner is almost parallel with the reinforcement fibers included in the prepreg.

When one side of a sheet-shaped prepreg is almost parallel with the reinforcement fibers included in the prepreg, the performance of the reinforcement fibers included in the prepreg can be effectively utilized. On the other hand, if the state is deviated from a state in which one side of a sheet-shaped prepreg is almost parallel with the reinforcement fibers included in the prepreg, that is, if the reinforcement fibers meander significantly with respect to one side of the prepreg, such a prepreg cannot sufficiently manifest the performance of the reinforcement fibers included therein, and there is a possibility that the physical properties of a laminated base material obtainable from the prepreg, and the physical properties of a molded article obtainable from the laminated base material may be noticeably deteriorated, which is not preferable.

Meanwhile, when it is said that "one side of a sheet-shaped prepreg is almost parallel with the reinforcement fibers included in the prepreg," this implies that 90% or more of the reinforcement fibers included in the prepreg are within the range of −5° to +5° with respect to one side in the longitudinal direction of the prepreg, preferably 95% or more of the reinforcement fibers are within the range of −2° to +2° with respect to one side in the longitudinal direction of the prepreg, and more preferably 95% or more of the reinforcement fibers are within the range of −1° to +1°.

Incidentally, there are occasions in which, depending on the method for producing a prepreg, resin-rich portions (burrs and the like) may occur at the edges of the prepreg. In such a case, a site at which the reinforcement fibers and the resin are integrated as intended, excluding the resin-rich portions, is considered as the edge.

According to the present invention, at the time of preheating for stamping molding, draw-down is suppressed, and excellent shapeability can be exhibited during stamping molding. According to the present invention, such an effect is manifested more effectively at the time of stamping molding of a large-sized prepreg. Specifically, in a case in which the shape in a plan view of a sheet-shaped prepreg is a quadrilateral shape, a preferred occasion is at the time of preheating for stamping molding of a prepreg which measures 500 mm to 2000 mm on at least one side. If the prepreg is small, the problem of draw-down is not likely to occur. The upper limit of the size is not particularly limited; however, the size is generally restricted in view of operability. A particularly effective occasion is at the time of preheating for stamping molding of a prepreg which measures 600 mm to 2000 mm or less on at least one side.

Meanwhile, the term "quadrilateral shape" as used herein means a polygonal shape having four apexes and four sides surrounded by four straight lines in a plan view, and it is acceptable that the four points are considered as the apexes of a quadrilateral shape, and the apexes may have roundness.

Furthermore, according to another aspect, the occasion of preheating for stamping molding of a large-sized prepreg, in which the surface area in a plan view is 900 $cm^2$ or larger, and more preferably 1600 $cm^2$ or larger, and the aspect ratio is 1.2 or higher, and more preferably 2 or higher, is preferred because such an effect can be manifested more effectively.

Meanwhile, the "aspect ratio" is a vertical-to-horizontal ratio, and is calculated from the maximum length in the alignment direction of the reinforcement fibers of the large-sized prepreg, and the maximum length in a direction that is approximately perpendicular to the alignment direction of the reinforcement fibers. The large-sized shape may be a circular shape or an elliptical shape in addition to a quadrilateral shape, and the aspect ratio is calculated on the basis of the definition described above and applied.

In order to suppress draw-down at the time of preheating for stamping molding and to manifest excellent shapeability during stamping molding, it is preferable that a band section 4 formed from the reinforcement fibers A cut by the slits 1 in the prepreg, and a band section 3 containing the "reinforcement fibers B having a length equivalent to 50% or more of the sheet length of the prepreg in the alignment direction of the reinforcement fibers" are provided alternately. Furthermore, it is more preferable that the band section 4 formed from the reinforcement fibers A and the band section containing the reinforced fibers B are alternately arranged in a plan view over the entire surface of the prepreg. Meanwhile, it is preferable that a band section containing the reinforcement fibers B is arranged, in a plan view, between one band section and another band section, both being formed from the cut reinforcement fibers A.

According to another aspect, it is preferable that a band section containing the reinforcement fibers B is arranged, in a plan view, between a first band section formed from the cut reinforcement fibers A and a second band section formed from the cut reinforcement fibers A. Meanwhile, regarding the "first band section" and the "second band section" as used herein, any two band sections formed from the cut reinforcement fibers A, which are adjacently arranged in a plan view, are arbitrarily selected, and one of them is designated as the first ban section, while the other is designated as the second band section.

For the band section 4 formed from the cut reinforcement fibers A and the band section 3 containing the "reinforcement fibers B having a length equivalent to 50% or more of the sheet length of the prepreg in the alignment direction of the reinforcement fibers", optimal dispositions can be appropriately selected based on the shape of the molding material used for the stamping molding.

According to the present invention, the reinforcement fibers B need to have a length equivalent to 50% or more of the sheet length of the prepreg in the alignment direction of the reinforcement fibers, and if this length is too short, the effect of suppressing draw-down cannot be sufficiently obtained. The length of the reinforcement fibers B is preferably 70% or more of the sheet length of the prepreg in the alignment direction of the reinforcement fibers, and particularly preferably equal to the sheet length of the prepreg in the alignment direction of the reinforcement fibers (the reinforcement fibers B are not cut off over the length from one side to the other side of the sheet-shaped prepreg).

That is, the reinforcement fibers B has a length of from 50% to 100% of the sheet length of the prepreg in the alignment direction of the reinforcement fibers, more preferably a length of from 70% to 100%, and particularly preferably a length of 100%.

Furthermore, the term "sheet length" as used herein means the length from one edge to the other edge of the prepreg in the alignment direction of the reinforcement fibers, and means a value measured using a long scale, a measure or the like.

Figure 3:
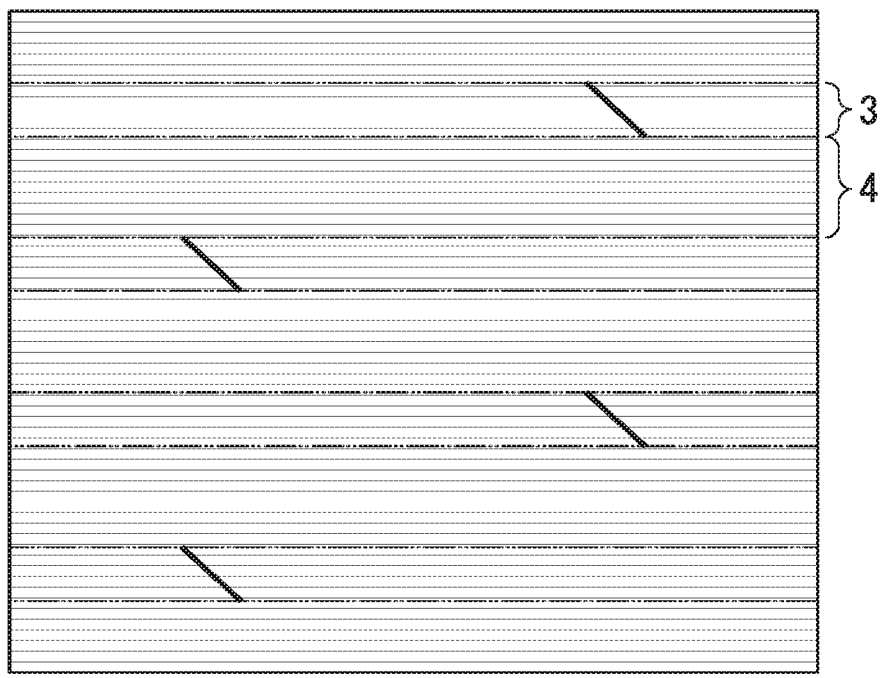
FIG. 3 is a diagram illustrating an example of the state in which at least one end of the reinforcement fibers B is positioned at an edge in the sheet length direction of the prepreg (that is, an edge of the prepreg in the alignment direction of the reinforcement fibers) (in the diagram, oblique lines represent the slits that cut off the reinforcement fibers B. Also, incisions in the band section formed from the reinforcement fibers A cut by the incisions are omitted).
Figure 4:
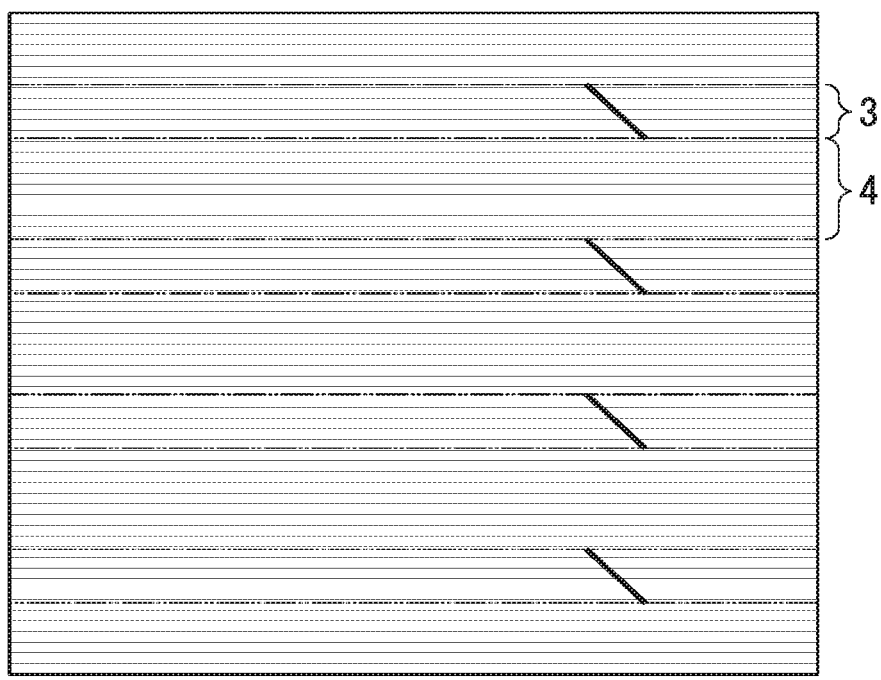
FIG. 4 is a diagram illustrating an example of the state in which at least one end of the reinforcement fibers B is positioned at an edge in the sheet length direction of the prepreg (that is, an edge of the prepreg in the alignment direction of the reinforcement fibers) (in the diagram, oblique lines represent the slits that cut off the reinforcement fibers B. Also, incisions in the band section formed from the reinforcement fibers A cut by the incisions are omitted).

Meanwhile, in FIG. 3 and FIG. 4, the reinforcement fibers B are formed as reinforcement fibers are cut by slits; however, this is only an example, and the reinforcement fibers may not be cut by slits. Furthermore, in FIG. 3 and FIG. 4, the slits that cut off the reinforcement fibers and form the reinforcement fibers B, may be provided obliquely to the alignment direction of the reinforcement fibers; however, the slits may be provided perpendicularly.

It is essential for the reinforcement fibers B that at least one end thereof is positioned at an edge in the sheet length direction of the prepreg (that is, an edge of the prepreg in the alignment direction of the reinforcement fibers). In a case in which neither of the two ends of the reinforcement fibers B is positioned at an edge in the sheet length direction of the prepreg, the effect of suppressing draw-down may not be sufficiently obtained.

When it is said that "at least one end of the reinforcement fibers B is positioned at an edge in the sheet length direction of the prepreg (that is, an edge of the prepreg in the alignment direction of the reinforcement fibers," specifically this implies a state such as shown in FIG. 3 or FIG. 4. This means that at least one end of the reinforcement fibers B is on an edge of the prepreg in the alignment direction of the reinforcement fibers.

Figure 5:
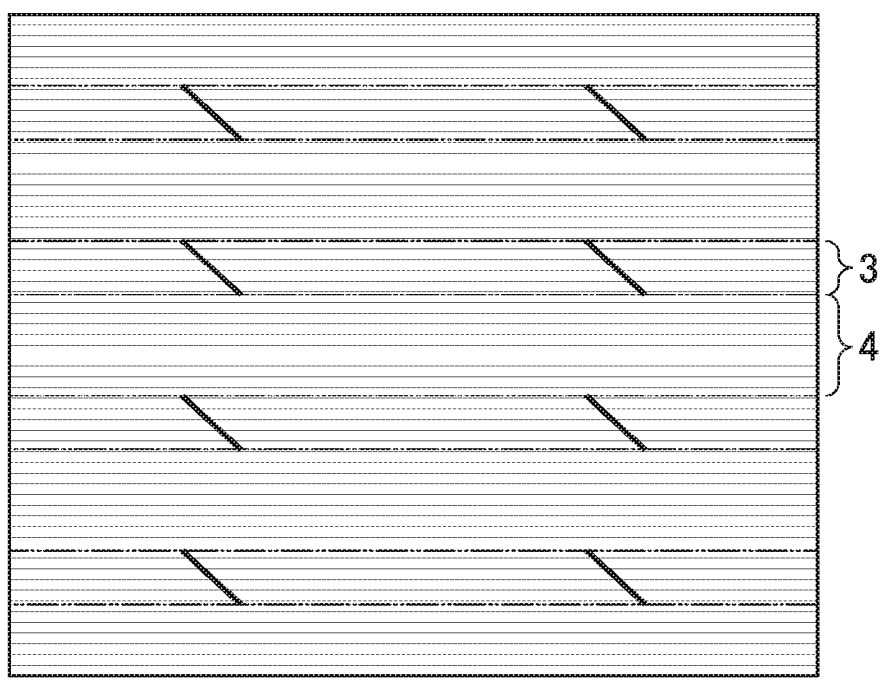
FIG. 5 is a diagram illustrating the state of including a band section in which neither of the two ends of the reinforcement fibers B is positioned at an edge of the sheet length direction of the prepreg (that is, an edge of the prepreg in the alignment direction of the reinforcement fibers) (in the diagram, oblique lines represent the slits that cut off the reinforcement fibers B. Also, incisions in the band section formed from the reinforcement fibers A cut by the incisions are omitted).

When it is said that "neither of the two ends of the reinforcement fibers B is positioned at an edge in the length direction of the sheet-shaped prepreg," specifically this implies a state such as that of the reinforcement fibers B included in a band having slits in FIG. 5. This means that neither of the two ends of the reinforcement fibers B is on an edge of the prepreg in the alignment direction of the reinforcement fibers.

In regard to the band section 3 containing the "reinforcement fibers B having a length equivalent to 50% or more of the sheet length of the prepreg in the alignment direction of the reinforcement fibers," which are included in the prepreg according to an embodiment of the present invention and a laminated base material thereof, the width Wn of the band section 3 in a direction perpendicular to the alignment direction of the reinforcement fibers (that is, the distance in a plan view of the band section containing the reinforcement fibers B in a direction perpendicular to the alignment direction of the reinforcement fibers) is preferably from 0.5 mm to 10.0 mm. If the width Wn is too small, it is difficult to perform processing such as described above, and there is a possibility that the processing cost may increase. Furthermore, the prepreg may have excellent stamping moldability; however, there is also a possibility that the effect of suppressing draw-down may be reduced. In a case in which the width Wn is too large, since the width Wn is too large, there is a possibility that flow may be inhibited at the time of stamping molding. Meanwhile, in a case in which there are plural band sections 3 containing the reinforcement fibers B in a sheet-shaped prepreg, it is preferable that the widths Wn of the band sections 3 containing the reinforcement fibers B are all the same, from the viewpoint of uniformity.

In regard to the band section containing the "reinforcement fibers B having a length equivalent to 50% or more of the sheet length of the prepreg in the alignment direction of the reinforcement fibers," which are included in the prepreg of the present invention and a laminated base material thereof, the pitch width of the band section (gap between one band section and another band section, both containing the reinforcement fibers B), Wp (that is, the shortest distance in a plan view between one band section and another band section, both containing the reinforcement fibers B and being adjacent arranged), is more preferably from 5 mm to 150 mm. If the pitch width Wp is too narrow, when molding is performed to obtain a shape in which complicated shapes such as ribs and bosses are compactly arranged, the establishment in which the reinforcement fibers B overlap with the ribs and bosses is increased, and as a result, there is a tendency that the stamping moldability is deteriorated. On the other hand, if the pitch width is too large, there is a tendency that the contribution to the suppression of draw-down may decrease. Furthermore, in the case of a prepreg which has slits over the entire surface and does not contain uncut reinforcement fibers, there is a possibility that a portion of the prepreg may be lost by an external force during handling such as conveyance of the prepreg. On the contrary, when band sections 3 containing the reinforcement fibers B that are not cut off are provided, there is a tendency that the loss such as described above is suppressed, and this tendency of suppression is increased as the pitch width Wp is smaller. Thus, handleability of the prepreg tends to be enhanced. The Wp is more preferably 5 mm or larger, and more preferably 10 mm or larger, and more preferably 120 mm or smaller, and even more preferably 90 mm or smaller. That is, the Wp is preferably from 5 mm to 120 mm, and more preferably from 10 mm to 90 mm.

Regarding the relationship between the width Wn and the pitch width Wp, it is preferable that the width values are appropriately changed depending on the external dimension of the molding material used for stamping molding, such that when the width Wn is made small, the pitch width is also made small. As an index, it is preferable that the surface area in a plan view of the "band section containing the reinforcement fibers B having a length equivalent to 50% or more of the sheet length of the prepreg in the alignment direction of the reinforcement fibers" is 1.4% to 35.0% relative to the total surface area in a plan view of the prepreg. More specifically, it is preferable that the proportion of the surface area of a band-shaped section having the reinforcement fibers B per unit area, which is calculated by the formula: $Wn/(Wn+Wp)$, in a plan view is from 1.4% to 35.0%. If the proportion of the reinforcement fibers is too low, the contribution to the suppression of draw-down tends to be lowered, and if the proportion is too high, stamping moldability tends to be markedly lowered, which is not preferable.

Furthermore, a technique of selecting a pattern that is optimal for the external dimension of the molding material used for stamping molding by varying the width Wn while setting the sum of the pitch width Wp and the width Wn to a constant value, is convenient and useful. The surface area of the band section having the reinforcement fibers B in a plan view is more preferably 1.45% or more, and even more preferably 1.5% or more, and more preferably 27.5% or less, and even more preferably 20.0% or less.

That is, the surface area of the band section having the reinforcement fibers B in a plan view is more preferably from 1.45% to 27.5%, and even more preferably from 1.5% to 20.0%, relative to the total surface area of the prepreg.

Fluidity at the time of stamping molding depends not only on the angle θ formed by a slit 1 that cuts off the fibers and a reinforcement fiber in a plan view, but also on the sum total 1a of the cutting lengths l in an area in a plan view of 1 m² of the prepreg. As the value of θ is larger, the shear force between the fibers is decreased, and thus high fluidity is obtained. As the value of la is larger, there are more cut portions in the prepreg, and therefore, fluidity is increased. In the case of stamping molding a flat plate, the value of θ is preferably from 25° to 70°, and the value of la is preferably from 10 m to 200 m. Furthermore, in the case of stamping molding a complicated shape such as ribs, the value of θ is preferably from 30° to 70°, and the value of la is preferably from 20 m to 200 m.

The mechanical properties, which are represented by bending strength and flexural modulus, are dependent not only on the angle θ formed by a slit 1 that cuts off the fibers and a reinforcement fiber in a plan view, but also on the sum total la of the cutting lengths l in an area in a plan view of 1 $m^2$ of the prepreg. It is known that as the angle θ formed by a slit and a reinforcement fiber in a plan view is smaller, the mechanical properties are superior. Also, as the value of la is smaller, the cut portion in the prepreg is smaller, and therefore, superior mechanical properties are obtained. For example, in order to utilize the prepreg in a quasi-structural member of a car, the value of θ is preferably from 25° to 70°, and the value of la is preferably from 10 m to 200 m. Furthermore, in order to utilize the prepreg in a structural member from which even higher mechanical strength is required, the value of θ is preferably from 25° to 60°, and the value of la is preferably from 10 m to 150 m.

The time for producing a prepreg provided with slits, and the production cost largely depend not only on the angle θ formed by a slit 1 that cuts off the reinforcement fibers and a reinforcement fiber in a plan view, but also on the sum total la of the cutting lengths l in an area in a plan view of 1 $m^2$ of the prepreg. In a case in which the value of θ is small while the value of la is large, and in a case in which cutting is achieved using a cutting plotter, the time taken by slit processing becomes very long. Furthermore, in the case of processing slits by punching, enormous production cost for the punching blade is required, cracks are likely to be generated in the direction of the reinforcement fibers at the time of punching, and sheet loss occurs between adjacent slits. Therefore, the value of θ is preferably from 15° to 70°, and the value of la is preferably from 10 m to 200 m. Furthermore, when the lamination process after incision processing is considered, the value of θ is preferably from 30° to 60°, and the value of la is more preferably from 20 m to 150 m.

The shape of a slit in a plan view is not necessarily a straight line shape. By using a curved line, the sum total la of the cutting lengths l in an area in a plan view of 1 $m^2$ of the prepreg can be increased, while having the same slit angle as that in the case of a straight line-shaped slit, and the same fiber length as that in the case of a straight line-shaped slit. In this case, an enhancement of stamping moldability can be expected while superior mechanical properties are maintained.

Meanwhile, the slit angle in a case in which the slit shape in a plan view is a curved line, is defined as the angle formed by a reinforcing fiber and an incision, and can be measured in the same manner as in the case of a straight line-shaped slit.

Regarding the reinforcement fibers that can be used for the prepreg according to an embodiment of the present invention and a laminated base material thereof, the kind of the reinforcement fibers is not particularly limited, and any of an inorganic fiber, an organic fiber, a metal fiber, or a reinforcement fiber having a hybrid configuration combining the aforementioned fibers can be used. Examples of the inorganic fiber include carbon fibers, graphite fibers, silicon carbide fibers, alumina fibers, tungsten carbide fibers, boron fibers, and glass fibers. Examples of the organic fiber include aramid fibers, high density polyethylene fibers, other general nylon fibers, and polyesters. Examples of the metal fiber include fibers of stainless steel and iron, and carbon fibers coated with metals may also be used. Among these, when mechanical characteristics such as the strength of the final molded article are considered, carbon fibers are preferred. Furthermore, the average fiber diameter (that is, the average of the maximum widths in cross-sections) in the cross-sections of the reinforcement fibers obtainable when the reinforcement fibers are cut off at any arbitrary plane that is perpendicular to the longitudinal direction of the reinforcement fibers, is preferably 1 to 50 μm, and more preferably 5 to 20 μm.

The resin that forms the prepreg according to an embodiment of the present invention and a laminated base material thereof may be a thermosetting resin or a thermoplastic resin, and particularly, examples of the thermosetting resin include thermally curable resins, photocurable resins, and resins produced by combined use of photocuring and thermal curing. In the case of a fiber-reinforced plastic using non-continuous reinforcement fibers, since destruction occurs such that the ends of the reinforcement fibers are linked to each other, strength and particularly impact resistance can be enhanced by using a thermoplastic resin, which generally has a higher toughness value than a thermosetting resin. Furthermore, since a thermoplastic resin is cooled and solidified without involving a chemical reaction, and thereby determines the shape, short-time molding is enabled, and excellent productivity is obtained.

Examples of such a thermoplastic resin that can be used include polyamides (nylon 6, nylon 66, and the like), polyolefins (polyethylene, polypropylene, and the like), modified polyolefins, polyesters (polyethylene terephthalate, polybutylene terephthalate, and the like), polycarbonates, polyamideimide, polyphenylene oxide, polysulfone, polyether sulfone, polyether ether ketone, polyether imide, polystyrene, ABS, polyphenylene sulfide, liquid crystal polyesters, and copolymers of acrylonitrile and styrene. Furthermore, mixtures of these compounds may also be used. Moreover, a copolymerized thermoplastic resin such as a copolymerized nylon of nylon 6 and nylon 66 may also be used.

Furthermore, depending on the required characteristics of the molded article intended to produce, a flame retardant, a weather resistance improving agent, other oxidation inhibitors, a thermal stabilizer, an ultraviolet absorber, a plasticizer, a lubricating agent, a colorant, a compatibilizer, an electrically conductive filler, and the like may also be added.

The prepreg according to an embodiment of the present invention and a laminated base material thereof need to have the reinforcement fibers cut off from the upper surface to the lower surface of the sheet, by means of the slits 1. The length L in the longitudinal direction of the cut reinforcement fibers A is not particularly limited; however, from the viewpoints of mechanical characteristics and fluidity, the length L is preferably from 5 mm to 100 mm. In order to achieve a balance between sufficient mechanical properties and the flow to thin sections such as ribs at the time of stamping molding, the length L is more preferably from 10 mm to 50 mm.

In regard to the laminated base material according to an embodiment of the present invention, as long as the prepreg that constitutes the laminated base material is a prepreg satisfy the range of the angle θ formed by the slit 1 that cuts the reinforcement fibers in a plan view and the reinforcement fiber, and the range of the sum total la of the cutting lengths in 1 $m^2$ of the prepreg in a plan view, prepregs having different lengths of slits and different numbers of slits may be laminated. At the time of stamping molding, it is preferable to have a large θ value and a large value of la for a section having a thin, three-dimensional shape such as a boss or a rib. For example, it is preferable to adjust the θ to a value of from 30° to 60°, and to adjust the la to a value of from 20 m to 150 m. On the contrary, for a section in which the flow is two-dimensional with a small flow length, and high mechanical properties are needed, it is preferable to have a small value of θ and a small value of la. For example, it is preferable to adjust the θ to a value of from 15° to 70°, and the la to a value of from 10 m to 200 m.

The laminated base material according to an embodiment of the present invention includes at least one sheet of the prepreg according to an embodiment of the present invention described above, and the laminated base material may be obtained by laminating plural sheets of prepregs in a plane direction (that is, the thickness direction in the laminated base material), while appropriately controlling the direction of the reinforcement fibers included in the prepreg.

In the laminated base material according to an embodiment of the present invention, it is preferable that plural sheets of sheet-shaped prepregs are laminated such that the directions of the reinforcement fibers of the prerpegs are quasi-isotropic, from the viewpoint of reducing the anisotropy of flow at the time of pressing. Furthermore, in the laminated base material according to an embodiment of the present invention, it is preferable that a prepreg in which the direction of the reinforcement fibers included in the prepreg is 0°, and a prepreg in which the direction of the reinforcement fibers is 90° are alternately laminated (that is, plural sheets of sheet-shaped prepregs constituting a laminated base material are alternately laminated such that the direction of the reinforcement fibers in a prepreg is perpendicular to the direction of the reinforcement fibers in a prepreg that is adjacent to the aforementioned prepreg in the planar direction), from the viewpoint of reducing the anisotropy of the strength of the laminated base material.

The term "quasi-isotropic" means that n layers are laminated (n≥3) by retarding the alignment direction of the reinforcement fibers included in the prepreg, by (360/n)°.

The number of sheets of the prepregs of the present invention included in the laminated base material according to an embodiment of the present invention can be appropriately selected according to the external dimension of the molding material, the preheating conditions at the time of stamping molding, the direction in which it is wished to suppress draw-down, and the conveyance method.

When stamping molding is carried out, it is effective to adjust the direction of the reinforcement fibers included in the prepreg of the present invention to a direction in which it is wished to suppress draw-down. Furthermore, in a case in which there are plural directions in which it is wished to suppress draw-down, it is effective to laminate plural sheets of prepregs having reinforcement fibers that face the direction. As another example, in a case in which the molding material needs distinction between the front and the rear, there is a direction in which it is wished to suppress draw-down, and the preheating conditions are mild, there is a possibility that the suppression of draw-down may be enabled by introducing one sheet of the prepreg of the present invention on the back surface of the laminated base material. On the other hand, in a case in which the laminated base material has no distinction between the front and the rear, and the preheating conditions are strict, there is a possibility that it may be necessary to introduce the prepreg of the present invention into all of the layers in the laminated base material. Furthermore, when a prepreg of the present invention having reinforcement fibers that are directed the 0° direction and the 90° direction in a plan view are provided with respect to the plane of the laminated base material, a draw-down suppressing effect can be obtained generally for applications in a large variety of fields. Of course, in a case in which suppression of draw-down is required even for the 45° direction and the 135° direction with respect to the plane of the laminated base material in a plan view, it is preferable to provide prepregs having reinforcement fibers that face the above-mentioned directions, in the laminated base material.

Regarding the position of the prepreg according to an embodiment of the present invention, which is included in the laminated base material according to an embodiment of the present invention, in a case in which draw-down is emphasized or in a case in which fluidity is emphasized, the prepreg according to an embodiment of the present invention may be unevenly distributed sequentially at the front and the rear or in the interior of the laminated base material. Furthermore, in a case in which it is wished to attain both draw-down and fluidity, the prepreg according to an embodiment of the present invention may be omnipresent within the laminated base material. At that time, the prepreg according to an embodiment of the present invention may be used in the entire layers, or a prepreg that is not in the scope of the present invention and the prepreg of the present invention may be used alternately. From the viewpoint of suppressing draw-down and maintaining fluidity, it is preferable to alternately laminate a prepreg that is not in the scope of the present invention and the prepreg according to an embodiment of the present invention.

In a case in which a laminated base material into which plural sheets of the prepreg according to an embodiment of the present invention are introduced is obtained, the present invention is not intended to be limited to a combination of prepregs having identical widths Wn and pitch widths Wp and conventionally known prepregs, and the Wn and the pitch width Wp may be varied for each of the layers.

Furthermore, the laminated base material of the present invention may also be obtained by laminating prepregs that are similar in the thickness direction. However, when defects represented by warpage occur, it is preferable to appropriately modify the design, such as by adopting a configuration that is symmetric in the thickness direction.

Regarding the laminated base material according to an embodiment of the present invention, it is preferable to laminate at least one layer which is formed from a thermoplastic resin and does not contain reinforcement fibers, between plural sheets of prepregs that constitute the laminated base material, from the viewpoint of further enhancing fluidity at the time of pressing.

The thickness of the layer that is formed from a thermoplastic resin and does not contain reinforcement fibers is preferably from 10 mm to 2000 μm. Regarding the lamination of the prepreg and a layer which is formed from a thermoplastic resin and does not contain reinforcement fibers, the two may be alternately laminated, may be disposed concentratedly at the center or in the surface layer of the laminated base material, or may be unevenly distributed within the laminated base material, or the lamination may be appropriately designed according to the fluidity or mechanical properties required from the laminated base material. Furthermore, regarding the layer that is formed from a thermoplastic resin and does not contain reinforcement fibers in the laminated base material, a resin having pores may also be used. In a case in which the resin has pores, for example, a resin having a porosity of 90% or higher is preferred from the viewpoint of weight reduction or from the viewpoint of the ease of material availability.

The form of the interface between the prepreg and the layer that is formed from a thermoplastic resin and does not contain reinforcement fibers can be appropriately designed according to the required characteristics. For example, in a case in which the boundary lines between the prepreg and the layer that is formed from a thermoplastic resin and does not contain reinforced fibers need to be uniform, a nonwoven fabric having a porosity of 90% or higher and a weight per area (or basis weight) of from 5 g/m$^2$ to 50 g/m$^2$ may be disposed at the interface between the two layers. By using this nonwoven fabric, the reinforcement fibers included in the prepreg can be prevented from flowing excessively. On the other hand, in a case in which it is necessary for the layer that is formed from a thermoplastic resin and does not contain reinforcement fibers, to be mixed together with the reinforcement fibers included in the prepreg at the interface from the viewpoint of enhancing the adhesiveness of the interface, the laminated base material may also be produced without providing the nonwoven fabric. Incidentally, from the viewpoints of deterioration of fluidity or mechanical properties and an increase in the production cost, it is preferable to mold the laminated base material without using a nonwoven fabric.

In addition, the "thickness of the layer that is formed from a thermoplastic resin and does not contain reinforcement fibers" means, when a laminated base material is left to stand on a horizontal surface and is cut in an arbitrary plane in a vertical direction, the maximum distance in the vertical direction of the layer that is formed from a thermoplastic resin and does not contain reinforcement fibers at the cutting plane.

Regarding such a layer formed from a thermoplastic resin, the same resin composition as the resin composition included in the prepreg, or a polyamide (nylon 6, nylon 66, or the like), a polyolefin (polyethylene, polypropylene or the like), a modified polyolefin, a polyester (polyethylene terephthalate, polybutylene terephthalate or the like), a polycarbonate, polyamideimide, polyphenylene oxide, polysulfone, polyether sulfone, polyether ether ketone, polyether imide, polystyrene, ABS, polyphenylene sulfide, a liquid crystal polyester, a copolymer of acrylonitrile and styrene, and the like can be preferably used.

Among those compounds described above, a polyolefin, a modified polyolefin, or a polyamide alone, or a blend thereof is more preferred from the viewpoints of adhesiveness, cost, and heat resistance.

Regarding the prepreg according to an embodiment of the present invention, when the fiber volume fraction Vf is 55% or less relative to the total volume of the prepreg, it is preferable because sufficient fluidity is obtained. As the value of Vf is lower, fluidity is enhanced; however, if the value of Vf is too low, it is difficult to obtain the mechanical characteristics required from a structural material. In view of the relationship between fluidity and mechanical characteristics, the value of Vf for the prepreg is preferably from 20% to 55%. The Vf value as such can be measured according to JIS K7075.

Regarding the laminated base material according to an embodiment of the present invention, when the fiber volume fraction Vf is 55% or less relative to the total volume of the laminate, depending on the proportions or the presence or absence of the prepreg and the layer formed from a thermoplastic resin, sufficient fluidity can be obtained, which is preferable. If the value of Vf is too low, it is difficult to obtain the mechanical characteristics required from a structural material. In view of the relationship between fluidity and mechanical characteristics, the value of Vf for the laminated base material is preferably from 15% to 55%. The Vf value as such can be measured according to JIS K7075.

Furthermore, the layer formed from a thermoplastic resin may be omnipresent within the laminated base material, or may be unevenly distributed. In that case, when the prepreg according to an embodiment of the present invention is provided at the front and the rear of the laminated base material, there is a possibility that the layer formed from a thermoplastic resin may contribute significantly to the suppression of draw-down.

Since the prepreg according to an embodiment of the present invention has slits, as the thickness of the divided prepreg is larger, the strength tends to decrease. Assuming that the prepreg is applied to a structural material, the thickness of the prepreg may be adjusted to be from 50 μm to 200 μm. On the other hand, if the thickness of the prepreg is too thin, handling of the prepreg is difficult, and the number of prepregs to be laminated in order to obtain a laminated base material becomes very large. Therefore, productivity may be deteriorated. Accordingly, from the viewpoint of productivity, the thickness of the prepreg is preferably from 50 μm to 200 μm.

The "thickness of the prepreg" as used herein means, when a sheet-shaped prerpeg is left to stand on a horizontal surface and the prepreg is cut in an arbitrary plane in a vertical direction, the maximum distance in the vertical direction at the cutting plane.

It is preferable for the laminated base material of the present invention that prepregs are adhered to one another, from the viewpoint of facilitating handling.

Adhesion between prepregs can be implemented by appropriately using the entire surface, stripes, edges only, spots, or the like, and the process can be appropriately selected from conventionally known methods such as ultrasonic welding, heat pressing, and heat sealing, or in combination thereof. Among them, spot welding using an ultrasonic welder is preferred from the viewpoint of mass productivity.

An embodiment of the production method related to the prepreg according to an embodiment of the present invention will be described below; however, the present invention is not intended to be particularly limited thereby.

A prepreg that can be used in the laminated base material according to an embodiment of the present invention can be obtained by, for example, preparing two sheets of a film-shaped thermoplastic resin, inserting, between the two sheets of thermoplastic resin, a reinforcement fiber sheet obtained by arranging reinforcement fibers in a sheet form, and performing heating and pressurization.

More specifically, two sheets of a film formed from a thermoplastic resin are sent out from two rolls, and also, a reinforcement fiber sheet supplied from a roll of a reinforcement fiber sheet is inserted between the two sheets of film. Subsequently, the films and the sheet are heated and pressurized. Regarding the means for heating and pressurizing, any known heating means and any known pressurizing means can be used, and for example, a method which requires a multistage process, such as a step of utilizing two or more heating rolls, or a step of using plural preheating apparatuses and plural pairs of heating rolls, may also be employed. Here, it is not necessary to use a single kind of the thermoplastic resin that constitutes the film, and films formed from different kinds of thermoplastic resins may be further laminated using an apparatus such as described above.

The production method depends significantly on the form of facilities, the kind of the thermoplastic resin, the heating temperature, the heating time, the pressurization pressure, the pressurization time and the like; however, the heating temperature is usually preferably 100° C. to 400° C. The heating time is preferably 0.1 to 30 minutes. On the other hand, the pressure at the time of pressurization is usually preferably 0.1 to 10 MPa. The pressurization time is preferably 0.1 seconds to 30 minutes. When these variables are in these ranges, the reinforcement fibers included in the prepreg can be impregnated with the thermoplastic resin, and therefore, it is preferable. Furthermore, regarding the prepreg that can be used in the laminated base material according to an embodiment of the present invention, any commercially available prepreg can also be used.

Meanwhile, the term "film shape" as used herein means a form similar to a sheet shape.

The prepreg according to an embodiment of the present invention can be obtained by inserting slits by utilizing a laser marker, a cutting plotter, a trimming die or the like, after the heating and pressurization process.

When the slits are slits provided using a laser marker, there is obtained an effect that complicated slits such as curved lines or zigzag lines can be processed at a high speed, which is preferable. Furthermore, when the slits are slits provided using a cutting plotter, there is obtained an effect that large-sized prepreg layers which measure 2 m or more can be processed, which is preferable. Furthermore, when the slits are slits provided using a trimming die, there is obtained an effect that processing can be carried out at a high speed, which is preferable.

In the subsequent step, a laminated base material is produced by laminating the prepreg obtained as described above such that the directions of the reinforcement fibers are quasi-isotropic, or crosswise lamination is achieved. At this time, a laminated base material can be obtained by performing spot welding with an ultrasonic welder (manufactured by Emerson Japan, Ltd., product name: 2000LPt), in view of the ease of handling. Furthermore, it is preferable for the laminated base material according to an embodiment of the present invention to laminate the prepreg so as to constitute 8 to 96 layers.

The term "crosswise lamination" means that lamination is achieved such that the reinforcement fibers included in a prepreg layer and the reinforcement fibers included in a prepreg adjoining the foregoing prepreg perpendicular intersect each other.

In the subsequent step, the laminated base material obtained as described above is integrated by a heating and pressurization process and a cooling and pressurization pressing process. These processes can be carried out using conventional apparatuses, for example, a heat press machine and a cold press machine, a heating and cooling multistage press machine, and the like. Specifically, the various processes can be carried out by, for example, disposing the laminated base material in a mold, and subjecting the laminated base material to heating and pressurization or cooling and pressurization.

In regard to the heating in the heating and pressurization process described above, the temperature may be dependent on the kind of the thermoplastic resin included in the laminated base material; however, it is preferable to heat the laminated base material to 100° C. to 400° C., and more preferably to 150° C. to 350° C. Furthermore, preliminary heating may also be carried out before the heating. The heating time in the heating and pressurization process may be dependent on various factors such as the form or temperature of the facilities, and the size of the object to be heated; however, the heating time is preferably 0.1 to 30 minutes.

In regard to the pressurization in the heating and pressurization process, the heating pressure or the pressure at the time of heating and pressurization applied to the laminated base material is preferably 0.1 to 10 MPa, and more preferably 0.2 to 2 MPa. This pressure is defined as the value obtained by dividing the pressing force by the surface area of the laminated base material. The pressurization time in the heating and pressurization process is preferably 0.1 to 30 minutes, and more preferably 0.5 to 15 minutes.

In the cooling and pressurization process, in regard to the cooling in the cooling and pressurization process, the temperature may be dependent on the kind of the thermoplastic resin included in the laminated base material; however, it is preferable to cool the laminated base material to 30° C. to 200° C., and more preferably to 50° C. to 150° C. The cooling time in the cooling and pressurization process may be dependent on various factors such as the form or temperature of the facilities, and the size of the object to be heated; however, the cooling time is preferably 0.1 to 30 minutes.

In regard to the pressurization in the cooling and pressurization process, the pressure is preferably 0.5 to 10 MPa, and more preferably 0.8 to 2 MPa. This pressure is defined as the value obtained by dividing the pressing force by the surface area of the laminated base material. The pressurization time in the cooling and pressurization process is preferably 0.1 to 30 minutes, and more preferably 0.5 to 15 minutes.

The thickness of the laminated base material that has been integrated through these processes is preferably 0.5 to 10 mm.

Furthermore, the "thickness of the laminated base material" as used herein means, when the laminated base material is left to stand on a horizontal surface and the laminated base material is cut in an arbitrary plane in a vertical direction, the maximum distance in the vertical direction at the cutting plane.

Meanwhile, the heating and pressurization process and the cooling and pressurization process described above may be carried out under the conditions in which a lubricating agent is present between a mold and the laminated base material. Since the fluidity of the reinforcement fibers included in the prepreg that constitutes the laminated base material is increased at the time of heating and pressurization as a result of the action of the lubricating agent, the extent of impregnation of the thermoplastic resin between the reinforcement fibers is increased, and also, voids existing between the reinforcement fibers and between the reinforcement fibers and the thermoplastic resin in the laminated base material thus obtainable can be reduced.

Regarding the lubricating agent, for example, a silicone-based lubricating agent or a fluorine-based lubricating agent can be used. Further, a mixture thereof may also be used.

Regarding the silicone-based lubricating agent, a heat-resistant silicone-based lubricating agent which can be used in a high temperature environment is preferably used. More specific examples thereof include silicone oils such as methylphenylsilicone oil and dimethylsilicone oil, and commercially available silicone oils can also be preferably used.

Regarding the fluorine-based lubricating agent, a heat-resistant fluorine-based lubricating agent which can be used in a high temperature environment is preferably used. Specific examples of such a fluorine-based lubricating agent include flourine oils such as perfluoro polyether oil and a low molecular weight polymer of ethylene trifluorochloride (weight average molecular weight: 500 to 1300).

The lubricating agent may be supplied onto any one surface or both surfaces of the laminated base material (that is, onto both the back surface and the front surface of the laminated base material), onto any one surface or both surfaces of the mold, or onto any one surface or both surfaces of both the laminated base material and the mold, using appropriate means such as a lubricating agent applicator, or the lubricating agent may be applied in advance on the surface of the mold. Among them, an embodiment in which the lubricating agent is supplied onto both surfaces of the laminated base material is preferred.

That is, according to another aspect of the production method related to the prepreg according to an embodiment of the present invention, there is provided a production method including:

preparing two sheets of a film-shaped thermoplastic resin;

inserting, between the two sheets of a film-shaped thermoplastic composition resin, a reinforcement fiber sheet obtained by arranging reinforcement fibers in a sheet form;

heating and pressurizing the thermoplastic composition resin sheets having the reinforcement fiber sheet interposed therebetween; and inserting slits into the reinforcement fibers after the heating and pressurization.

The heating temperature may be 100° C. to 400° C., and the heating time may be 0.1 to 30 minutes. The pressure at the time of pressurization may be 0.1 to 10 MPa, and the pressurization time may be 0.1 to 30 minutes.

According to another aspect of the production method related to the laminated base material according to an embodiment of the present invention, there is provided a production method including:

laminating the prepreg produced by the method for producing a prepreg such that the directions of the reinforcement fibers are quasi-isotropic, or crosswise lamination is achieved; and integrating the laminated base material thus laminated, by a heating and pressurization process and a cooling and pressurization process.

In the heating and pressurization process, the heating temperature may be 100° C. to 400° C., the heating time may be 0.1 minutes to 30 minutes, the pressurization pressure may be 0.1 to 10 MPa, and the pressurization time may be 0.1 minutes to 30 minutes.

Furthermore, in the cooling and pressurization process, the cooling temperature may be 30° C. to 200° C., the cooling time may be 0.1 to 30 minutes, the pressurization pressure may be 0.5 to 10 MPa, and the pressurization time may be 0.1 to 30 minutes.

Furthermore, the heating and pressurization process and the cooling and pressurization process may be carried out under the conditions in which a lubricating agent exists between the mold and the laminated base material.

A molded product obtained using the laminated base material according to an embodiment of the present invention becomes a molded product through two processes, namely, a preheating process and stamping molding.

The preheating method in the preheating process can be carried out by any conventionally known method. For example, a system can be appropriately selected from a hot air drying system, a vapor drying system, an induction heating system, an infrared heater system and the like, and used. Among them, an infrared heater system that is capable of uniform irradiation and has a high temperature increasing effect, is preferred. Furthermore, one or more of preheating facilities of the same type or of different types may also be combined, depending on the thickness of the laminated base material or the like.

The preheating temperature at the time of preheating in the preheating process may vary depending on the thermoplastic resin used; however, regarding the lower limit temperature, it is preferable to heat to 150° C. or higher, and more preferably 180° C. or higher. Regarding the upper limit temperature, it is preferable to heat at 400° C. or lower, and more preferably 350° C. or lower. That is, the preheating temperature at the time of preheating is preferably from 150° C. to 400° C., and more preferably from 180° C. to 350° C. By applying a preheating temperature, the conformity to a more complicated shape at the time of stamping molding is enhanced. However, since there is a possibility that decomposition may occur depending on the kind of the thermoplastic resin used, it is preferable to perform molding in an appropriate temperature range. Furthermore, if the preheating temperature is set to be too high, excessive overheating may occur, and there is a possibility that deterioration of handleability may occur to an extent that exceeds the effect of increased moldability.

The preheating time is dependent significantly on the kind and form of the apparatus, the kind of the resin, and the like; however, the preheating time is preferably 0.25 to 30 minutes. In a case in which heating is performed in a short time period of shorter than 0.25 minutes, there is a possibility that the temperature difference between the surface layer and the interior of the object to be heated may become large. In a case in which heating is performed over a long time period of longer than 30 minutes, although the preheating time may vary depending on the kind of the resin or the atmosphere conditions of the apparatus, there is a possibility that the resin may become brittle.

Furthermore, there is also available a thermoplastic resin, in which thermal decomposition is accelerated in air, and thermal decomposition is reduced by blocking air. In that case, the laminated base material may be appropriately covered with a heat-resistant film or sheet.

There is available a technique in which, at the time of transfer to the preheating process and the stamping process, in order to enhance handleability, a metal frame is provided, tension is applied to the laminated base material by tethering the material to the frame with an elastic body, for example, a metal spring, to suspend the laminated base material in midair, subsequently preheating the metal frame, and performing stamping molding. In this technique, since each metal frame can be transferred to the stamping process at the time of transfer from the preheating process to the stamping process, handleability is enhanced compared to the technique of directly conveying a material that has been softened by preheating. Furthermore, the material is prevented from being brought into contact to a mold for a long time and being excessively cooled during the stamping process, and as the laminated base material that is suspended in midair by the metal frame, is brought into contact with an upper mold and a lower mold in close timing, moldability and the molding appearance can also be enhanced. In addition to that, even when the laminated base material is conveyed from the preheating process to the stamping process using an industrial robot, the material can be conveyed by appropriately using a pointed unit such as a needle-shaped unit, a knife-shaped unit, a suction unit, or a wire-shaped unit.

The mold temperature at the time of stamping molding may vary depending on the thermoplastic resin used; however, the lower limit temperature is preferably 40° C., and more preferably 50° C. The upper limit temperature is preferably 300° C., and more preferably 200° C. That is, the mold temperature at the time of stamping molding is preferably from 40° C. to 300° C., and more preferably from 50° C. to 200° C. If the lower limit temperature of the mold temperature is too low, when the laminated base material is charged, the laminated base material is rapidly cooled, and there is a possibility that the conformity to a complicated shape such as a rib or a boss may noticeably dropped. On the other hand, if the mold temperature is too high, high conformity to a complicated shape such as a rib or a boss may be obtained; however, although the crystallization time may vary depending on the thermoplastic resin used, the crystallization time may be excessively prolonged, and there is a possibility that the molding appearance may be deteriorated, or in some cases, the thermoplastic resin may be uncured.

The molding pressure at the time of stamping molding is dependent on the size or shape of the molded product; however, the molding pressure is preferably from 1 MPa to 200 MPa. If the molding pressure is less than 1 MPa, air cannot be pulled out from the molded product, and there is a possibility that decrease in the physical properties may be brought forth, or smoothness of the surface of the molded product may not be obtained. If the molding pressure is more than 200 MPa, deformation such as warpage, which occurs at the time of low pressure molding, tends to be decreased; however, the molding machine required upon performing such molding tends to be limited or tends to be expensive.

The pressurization time is preferably from 0.5 minutes to 10 minutes. If the pressurization time is less than 0.5 minutes, there is a possibility that solidification, crystallization or curing of the resin may be insufficiently achieved, If the pressurization time is longer than 10 minutes, there is a possibility that the molding cycle may be decreased, and mass productivity may be decreased.

That is, according to another aspect of the method for producing a molded product using the laminated base material according to an embodiment of the present invention, there is provided a production method including a preheating step of preheating a laminated base material produced by the production method described above; a conveyance step of conveying the preheated laminated base material to a stamping process; and a stamping step of stamping molding the conveyed laminated base material.

The preheating temperature in the preheating step may be from 150° C. to 400° C., and the preheating time may be 0.25 seconds to 30 minutes.

In regard to the stamping step, the mold temperature at the time of stamping molding may be from 40° C. to 300° C.

EXAMPLES

Hereinafter, the present invention will be specifically described by way of Examples, but the present invention is not intended to be limited by these Examples.

<Evaluation Methods>

(Measurement of Fiber Volume Fraction)

The density of a prepreg was measured by a method according to JIS K7075. Thereafter, the fiber volume content (Vf) relative to the total volume of the prepreg was calculated from the densities of carbon fibers and a resin film.

(Evaluation of Plane Fluidity)

A laminated base material of the present invention produced to have a thickness of 2 mm was cut into a specimen which measured 78 mm on each side, and then two sheets thereof were stacked and maintained for 10 minutes in a heater that had been heated in advance to 230° C. Subsequently, the laminated base material sheets were immediately transferred to a small-sized press machine (manufactured by Toyo Seiki Seisakusho, Ltd., product name: Mini Test Press MP-2FH) that had been heated to 145° C. and mounted thereon, and the laminated base material sheets were pressed under the conditions of 10 MPa and 60 seconds. In this case, the value obtained by dividing the thickness before pressing by the thickness after pressing was designated as fluidity.

Regarding the determination criteria for fluidity, fluidity was determined as follows.

"D" "fluidity"≤1.5
"C" 1.5<"fluidity"≤2.0
"B" 2.0<"fluidity"≤2.5
"A" 2.5<"fluidity"

In addition, the flow behavior in the plane direction of the samples after plane flow was also checked by visual inspection. When the flow was markedly non-uniform, the sample was rated as "D" regardless of the value of fluidity.

(Draw-Down)

A specimen having a size of 150 mm×300 mm was cut out from the laminated base material of the present invention, and the two ends in the major axis direction were fixed using a frame having an inner dimension of 260 mm×260 mm. Thereafter, using a sagging testing machine manufactured by Misuzu Erie Co., Ltd., the specimen was introduced into a heating furnace inside the testing machine in which heaters were arranged vertically, and then the displacement at the center of the title laminated base material was measured sequentially from the initiation of heating by means of laser light. Since the sheet undergoes sagging as heated, the displacement advances in the negative direction relative to the initial displacement (0 mm). Regarding the evaluation results, determination was carried out according to the following criteria, based on the absolute value of displacement when the surface temperature of the laminated base material reached 230° C. to 250° C. after 80 to 90 seconds from the initiation of heating.

"A" 0≤|displacement|≤5
"B" 5<|displacement|≤10
"C" 10<|displacement value|≤15
"D" 15<|displacement value|

(Rib Fluidity)

Using a far-infrared heater type heating apparatus (manufactured by NGK Kiln Tech Corp., product name: H7GS-71289) in which the heater temperature was set to 250° C., three sheets of a laminated base material cut to a size of 100 mm in width and 200 mm in length were arranged not to overlap each other, and were softened by heating for 5 minutes and 30 seconds. Using a 100-t press machine (Manufactured by Kawasaki Hydromechanics Corp.) which was equipped with a mold having ribs on the back surface, the ribs having a width of 70 mm to 60 mm, a height of 60 mm, and a thickness of 3 mm to 2 mm, and having a columnar part for ejector pin having a diameter of 6 mm embedded at the center in the width direction, and used a molding mold having a mold casting area of 140×240 mm, three sheets of the preheated and softened laminated base material were disposed in the lower molding mold, and press molding was carried out under the conditions of a charging time of 25 seconds, a mold temperature of 130° C., an added pressure of 60 t and 100 t, and a molding time of 1 minute. Thus, a molded product was obtained. Among the molded articles thus obtained, molded articles obtained under the conditions of an added pressure of 60 t and molded articles obtained under the conditions of an added pressure of 100 t were respectively subjected to determination according to the following criteria.

"A" "rib filling ratio"=100%
"B" 80%<"rib filling ratio"<100%
"C" 50%<"rib filling ratio"≤80%
"D" "rib filling ratio"≤50%

Meanwhile, the rib filling ratio is defined by the expression: (total volume of ribs in the molded product thus obtained)/(total volume of ribs calculated from the mold shape)×100 [%]

(Frame Molding)

A laminated base material of the present invention was cut to a size of 520 mm in width and 260 mm in length, and then a hole having a diameter of 6 mm was punched at each of the four holes and at the center of each side. The holes and spring mounting units provided at the four corners and at the centers of the respective sides of a metal frame having an external dimension of 700 mm in width, 600 mm in length and 50 mm in height, were connected using metal springs having a free length of 50 mm and 75 mm. The specimen was pulled in eight directions while tension was applied thereto. Thus, the laminated base material was disposed so as to be suspended in midair at a height of 10 mm to 50 mm.

Subsequently, every metal frame was mounted on a 300-t press machine (manufactured by Kawasaki Hydromechanics Corp.) equipped with a molding mold, and press molding was carried out under the conditions of a charging time of 20 seconds, a mold temperature of 145° C., a molding pressure of 20 MPa, and a molding time of 1 minute.

Meanwhile, the molding mold mounted on the 300-t press machine is a non-landed mold having a width of 400 mm, a length of 95 mm, and a depth of 25 mm, with the four corners having a curved shape, positioned at the center of the molding machine, and is a mold in which the fixing place for a metal frame is designed such that the metal frame does not disturb the molding mold. Therefore, it is designed such that when a melt frame is installed at a fixed place for frame in the molding machine, the laminated base material suspended using metal springs is positioned at the center of the molding mold, while the upper mold and the lower mold are not brought into contact. From a series of flows of this molding, draw-down and moldability were determined according to the following criteria.

"A" The laminated base material completely conforms to the mold, and the laminated base material after preheating is not in contact with the lower mold.

"B" The laminated base material completely conforms to the mold, and the laminated base material after preheating is in contact with the lower mold.

"C" Conformity of the laminated base material to the mold is imperfect, and the laminated base material after preheating is not in contact with the lower mold.

"D" Conformity of the laminated base material to the mold is imperfect, and the laminated base material after preheating is in contact with the lower mold.

Production Example 1

Carbon fibers (manufactured by Mitsubishi Rayon Co., Ltd., product name: TR50S15L, 12000 fibers, density: 1.82 g/cm$^2$) were arranged in a unidirectional plane shape such that the weight per area reached 72.0 g/m$^2$, and thus a carbon fiber sheet was obtained. A resin film (acid-modified polypropylene, manufactured by Mitsubishi Chemical Corp., product name: MODIC P958) having a weight per area of 36.4 g/m$^2$ was laminated on both surfaces of this carbon fiber sheet, and thus a laminate was obtained. This laminate was passed several times through calender rolls that had been heated to 200° C. to 220° C., and thereby the resin film was melted and impregnated into the carbon fiber sheet. Thus, a prepreg 1 was obtained.

The thickness of the prepreg 1 thus obtained was 120 μm, the weight per area was 145.0 g/m$^2$, and the fiber volume fraction (VI) was 33.0%.

Production Example 2

Carbon fibers (manufactured by Mitsubishi Rayon Co., Ltd., product name: TR50S15L, 12000 fibers, density: 1.82 g/cm$^2$) were arranged in a unidirectional plane shape such that the weight per area reached 72.0 g/m$^2$, and thus a carbon fiber sheet was obtained. A resin film (nylon 6, manufactured by Ube Industries, Ltd., product name: UBE1013B) having a weight per area of 45.6 g/m$^2$ was laminated on both surfaces of this carbon fiber sheet, and thus a laminate was obtained. This laminate was passed several times through calender rolls that had been heated to 200° C. to 280° C., and thereby the resin film was melted and impregnated into the carbon fiber sheet. Thus, a prepreg 2 was obtained. The thickness of the prepreg 2 thus obtained was 120 μM, the weight per area was 145.0 g/m$^2$, and the fiber volume fraction (VI) was 33.0%.

Comparative Example 1

The prepreg 1 obtained in Production Example 1 was cut out into a size of 1240 mm×940 mm using a cutting plotter (manufactured by Laserck Corp., product name: L-2500). Sixteen layers of the prepreg thus obtained were laminated so as to obtain a fiber axis direction of $[(0/45/90/-45)_S]_2$, and then the prepreg layers were spot welded with an ultrasonic welding machine (manufactured by Emerson Japan, Ltd., product name: 2000 LPt). Thus, a quasi-laminated base material 1 was obtained.

Meanwhile, regarding the meaning of $[(0/45/90/-45)_S]_2$, "S" means symmetry, that is, being symmetric, and "2" refers to the number of repetitions. That is, $[(0/45/90/-45)_S]_2$ may be described otherwise as $[(0/45/90/-45/-45/90/4510)]_2$ or $[(0/45/901-45)_S(0/45/90/-45)_S]$, or may be further described otherwise as (0/45/90/-45/-45/90/45/0/0/45/90/-45/-45/90/45/0).

The quasi-laminated base material 1 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus a laminated base material 1 was obtained. The laminated base material 1 thus obtained did not have fiber meandering, with the reinforcement fibers evenly flowing to the edges, did not have warpage, and maintained satisfactory external appearance and smoothness. The laminated base material thus obtained was subjected to evaluations of draw-down, rib fluidity, and plane fluidity in sequence. The results are presented in Table 1.

Comparative Example 2

The prepreg 1 obtained in Production Example 1 was cut into a size of 1240 mm×940 mm, and slits were inserted therein at a constant interval as illustrated in FIG. 1 using a cutting plotter (manufactured by Laserck Corp., product name: L-2500). Thus, a slitted prepreg 1 was obtained. At that time, slitting processing was carried out, except for the portions extending up to 10 mm inward from the edges of the sheet, such that the length of the reinforcement fibers L was constant at 25.0 mm, and the angle θ formed by a slit that cut off the fibers and a reinforcement fiber in a plan view was 45°. At this time, the sum total 1a of the cutting lengths in an area of 1 m² in a plan view of the prepreg was 56.6 m.

Sixteen layers of the slitted prepreg 1 thus obtained were laminated such that the fiber axis direction was $[(0/45/90/-45)_S]_2$, and the direction of the slits was $[(-45/0/45/90)_S]_2$, and then the prepreg layers were spot welded using an ultrasonic welding machine (manufactured by Emerson Japan, Ltd., product name: 2000LPt). Thus, a quasi-laminated base material 2 was obtained.

The quasi-laminated base material 2 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus a laminated base material 2 was obtained.

The laminated base material 2 thus obtained did not have fiber meandering, with the reinforcement fibers evenly flowing to the edges, did not have warpage, and maintained satisfactory external appearance and smoothness. The laminated base material thus obtained was subjected to evaluations of draw-down, rib fluidity, and plane fluidity in sequence. The results are presented in Table 1.

Comparative Example 3

Processing and molding were carried out in the same manner as in Comparative Example 2, except that the prepreg 2 obtained in Production Example 2 was used, and the molding temperature at the time of molding was changed to 250° C. Thus, a slitted prepreg 2, a quasi-laminated base material 3, and a laminated base material 3 were obtained in sequence.

The laminated base material 3 thus obtained did not have fiber meandering, with the reinforcement fibers evenly flowing to the edges, did not have warpage, and maintained satisfactory external appearance and smoothness. Frame molding was performed using the laminated base material 3 thus obtained. The results are presented in Table 1.

Example 1

Figure 2:
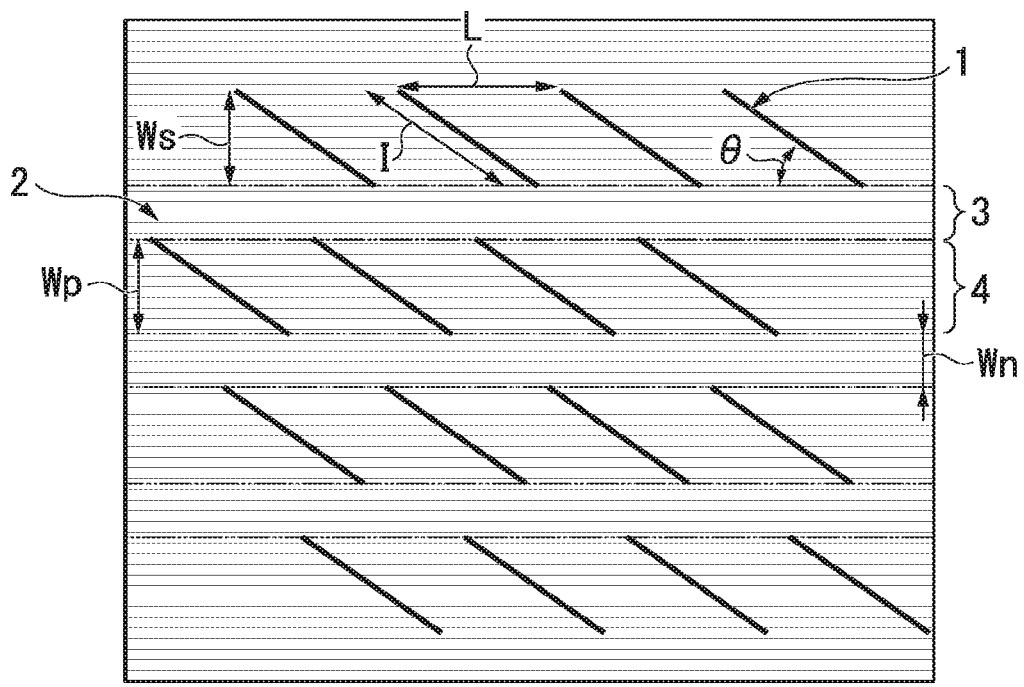
FIG. 2 is a diagram illustrating a prepreg according to an embodiment of the present invention.

The prepreg 2 obtained in Production Example 2 was cut out into a size of 1240 mm×940 mm, and the prepreg was processed as illustrated in FIG. 2 using a cutting plotter (manufactured by Laserck Corp., product name: L-2500) to obtain a slitted prepreg 3. Meanwhile, the parameters required for the processing of the slitted prepreg 3, and the sum total 1a of the cutting lengths in an area of 1 m² in a plan view of the prepreg are presented in Table 2. In the slitted prepreg 3 thus obtained, slipping of prepreg fragments did not occur in any of the processes for processing, conveyance, lamination and the like.

Subsequently, the 0° layer and the 90° layer in the non-spot welded product of the quasi-laminated base material 3 obtained in Comparative Example 3 were replaced with the slitted prepreg 3, and then the laminate was spot welded with an ultrasonic welding machine (manufactured by Emerson Japan, Ltd., product name: 2000LPt) to obtain a quasi-laminated base material 4. The quasi-laminated base material thus obtained was such that the fiber axis direction was $[(0/45/90/45)_S]_2$, and the direction of slits was $[(-45/0/45/90)_S]_2$.

The quasi-laminated base material 4 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus a laminated base material 4 was obtained.

The laminated base material 4 thus obtained did not have fiber meandering, with the reinforcement fibers evenly flowing to the edges, did not have warpage, and maintained satisfactory external appearance and smoothness. Frame molding was performed using the laminated base material 4 thus obtained. The results are presented in Table 2.

Examples 2 to 5

The prepreg 1 obtained in Production Example 1 was cut out into a size of 1240 mm×940 mm, and the prepreg was processed as illustrated in FIG. 2 using a cutting plotter (manufactured by Laserck Corp., product name: L-2500) to obtain slitted prepregs 4 to 7, respectively. Meanwhile, the parameters required for the processing of the slitted prepregs 4 to 7, and the sum totals 1a of the cutting lengths in an area of 1 m² in a plan view of the prepregs are presented in Table 2. In the slitted prepregs 4 to 7 thus obtained, slipping of prepreg fragments did not occur in any of the processes for processing, conveyance, lamination and the like.

Subsequently, the 0° layer and the 90° layer in the non-spot welded product of the quasi-laminated base material 2 obtained in Comparative Example 2 were replaced with each of the slitted prepregs 4 to 7, and then the laminates were spot welded with an ultrasonic welding machine (manufactured by Emerson Japan, Ltd., product name: 2000LPt) to obtain quasi-laminated base materials 5 to 8. The quasi-laminated base material thus obtained was such that the fiber axis direction was $[(0/45/90/45)_S]_2$, and the direction of slits was $[(-45/0/45/90)_S]_2$.

Each of the quasi-laminated base materials 5 to 8 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 5 to 8 were obtained.

The laminated base materials thus obtained did not have fiber meandering, with the reinforcement fibers evenly flowing to the edges, did not have warpage, and maintained satisfactory external appearance and smoothness. The laminated base materials thus obtained were subjected to evaluations of draw-down, rib fluidity, and plane fluidity in sequence. The results are presented in Table 2.

Examples 6 to 9

The sixteen layers from the top layer to the back surface of the non-spot welded product of the quasi-laminated base material 2 obtained in Comparative Example 2 were designated as a $1^{st}$ layer, a $2^{nd}$ layer, . . . , and a $16^{th}$ layer in sequence, and a product in which the 1$^{st}$ layer, the 6$^{th}$ layer, the 11$^{th}$ layer and the 16$^{th}$ layer were replaced with the slitted prepreg 4; a product in which the 6$^{th}$ layer, the 8$^{th}$ layer, the 9$^{th}$ layer and the 11$^{th}$ layer were replaced with the slitted prepreg 4; a product in which the 1$^{st}$ layer, the 3$^{rd}$ layer, the 14$^{th}$ layer and the 16$^{th}$ layer were replaced with the slitted prepreg 4; and a product in which the slitted prepreg 4 was introduced between the 8$^{th}$ layer and the 9$^{th}$ layer, were respectively laminated. Subsequently, the laminates were spot welded with an ultrasonic welding machine (manufactured by Emerson Japan, Ltd., product name: 2000LPt), and thus quasi-laminated base materials 9 to 12 were obtained. The quasi-laminated base materials 9 to 11 thus obtained were such that the fiber axis direction was $[(0/45/90/-45)_S]_2$, and the direction of slits was $[(-45/0/45/90)_S]_2$. Similarly, the sequential laminated base material 12 thus obtained was such that the fiber axis direction was $[(0/45/90/-45)_S/0/(0/45/90/-45)_S]$, and the direction of slits was $[(-45/0/45/90)_S/-45/(-45/0/45/90)_S]$.

Each of the quasi-laminated base materials 9 to 12 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 9 to 12 were obtained.

The laminated base materials 9 to 12 thus obtained did not have fiber meandering, with the reinforcement fibers evenly flowing to the edges, did not have warpage, and maintained satisfactory external appearance and smoothness. The laminated base materials thus obtained were subjected to an evaluation of draw-down. The results are presented in Table 3.

Comparative Example 4 and Examples 10 to 13

The prepreg 1 obtained in Production Example 1 was cut out into a size of 1240 mm×940 mm, and the prepreg was processed as illustrated in FIG. 2 using a cutting plotter (manufactured by Laserck Corp., product name: L-2500) to obtain slitted prepregs 8 to 12, respectively. Meanwhile, the parameters required for the processing of the slitted prepregs 8 to 12, and the sum totals la of the cutting lengths in an area of 1 m$^2$ in a plan view of the prepregs are respectively presented in Table 2. In the slitted prepregs 8 to 12 thus obtained, slipping of prepreg fragments did not occur in any of the processes for processing, conveyance, lamination and the like.

Sixteen layers of each of the slitted prepregs 8 to 12 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, quasi-laminated base materials 13 to 17 were obtained.

Each of the quasi-laminated base materials 13 to 17 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 13 to 17 were obtained.

The laminated base materials 13 to 17 thus obtained did not have fiber meandering, with the reinforcement fibers evenly flowing to the edges, did not have warpage, and maintained satisfactory external appearance and smoothness. The laminated base materials thus obtained were subjected to evaluations of draw-down, rib fluidity, and plane fluidity. The results are presented in Table 4.

Examples 14 to 17

The prepreg 1 obtained in Production Example 1 was cut out into a size of 1240 mm×940 mm, and the prepreg was processed as illustrated in FIG. 2 using a cutting plotter (manufactured by Laserck Corp., product name: L-2500) to obtain slitted prepregs 13 to 16, respectively. Meanwhile, the parameters required for the processing of the slitted prepregs 13 to 16, and the sum totals la of the cutting lengths in an area of 1 m$^2$ in a plan view of the prepregs are presented in Table 5, respectively. In the slitted prepregs 13 to 16 thus obtained, slipping of prepreg fragments did not occur in any of the processes for processing, conveyance, lamination and the like.

Sixteen layers of each of the slitted prepregs 13 to 16 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, quasi-laminated base materials 18 to 21 were obtained.

Each of the quasi-laminated base materials 18 to 21 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 18 to 21 were obtained.

The laminated base materials 18 to 21 thus obtained did not have fiber meandering, with the reinforcement fibers evenly flowing to the edges, did not have warpage, and maintained satisfactory external appearance and smoothness. The laminated base materials thus obtained were subjected to evaluations of draw-down, rib fluidity, and plane fluidity. The results are presented in Table 5.

Comparative Example 5

Production of a slitted prepreg 17 was attempted by cutting out the prepreg 1 obtained in Production Example 1 into a size of 1240 mm×940 mm, and attempting the processing as illustrated in FIG. 2 using a cutting plotter (manufactured by Laserck Corp., product name: L-2500). However, it was confirmed that the production time was long, and the yield was markedly low. Therefore, subsequent lamination and molding of the quasi-laminated base material 22 and the laminated base material 22 were not implemented, and further evaluations were not performed. Meanwhile, the parameters required for the processing of the slitted prepreg 17 are respectively presented in Table 6.

Examples 18 and 19 and Comparative Example 6

The prepreg 1 obtained in Production Example 1 was cut out into a size of 1240 mm×940 mm, and the prepreg was processed as illustrated in FIG. 2 using a cutting plotter (manufactured by Laserck Corp., product name: L-2500) to obtain slitted prepregs 18 to 20, respectively. Meanwhile, the parameters required for the processing of the slitted prepregs 18 to 20, and the sum totals la of the cutting lengths in an area of 1 m² in a plan view of the prepregs are presented in Table 1, respectively. In the slitted prepregs 18 to 20 thus obtained, slipping of prepreg fragments did not occur in any of the processes for processing, conveyance, lamination and the like.

Sixteen layers of each of the slitted prepregs 18 to 20 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, quasi-laminated base materials 23 to 25 were obtained.

Each of the quasi-laminated base materials 23 to 25 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 23 to 25 were obtained.

The laminated base materials 23 to 25 thus obtained did not have fiber meandering, with the reinforcement fibers evenly flowing to the edges, did not have warpage, and maintained satisfactory external appearance and smoothness. The laminated base materials thus obtained were subjected to evaluations of draw-down, rib fluidity, and plane fluidity. The results are presented in Table 6.

Comparative Example 7

Production of a slitted prepreg 21 was attempted by cutting out the prepreg 1 obtained in Production Example 1 into a size of 1240 mm×940 mm, and attempting the processing as illustrated in FIG. 2 using a cutting plotter (manufactured by Laserck Corp., product name: L-2500). However, it was confirmed that the production time was long, and the yield was markedly low. Therefore, subsequent lamination and molding of the quasi-laminated base material 26 and the laminated base material 26 were not implemented, and further evaluations were not performed. Meanwhile, the parameters required for the processing of the slitted prepreg are respectively presented in Table 7.

Examples 20 to 22 and Comparative Example 8

The prepreg 1 obtained in Production Example 1 was cut out into a size of 1240 mm×940 mm, and the prepreg was processed as illustrated in FIG. 2 using a cutting plotter (manufactured by Laserck Corp., product name: L-2500) to obtain slitted prepregs 22 to 25, respectively. Meanwhile, the parameters required for the processing of the slitted prepregs 22 to 25, and the sum totals la of the cutting lengths in an area of 1 m² in a plan view of the prepregs are presented in Table 7, respectively. In the slitted prepregs 22 to 25 thus obtained, slipping of prepreg fragments did not occur in any of the processes for processing, conveyance, lamination and the like.

Sixteen layers of each of the slitted prepregs 22 to 25 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, quasi-laminated base materials 27 to 30 were obtained.

Each of the quasi-laminated base materials 27 to 30 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 27 to 30 were obtained.

The laminated base materials 27 to 30 thus obtained did not have fiber meandering, with the reinforcement fibers evenly flowing to the edges, did not have warpage, and maintained satisfactory external appearance and smoothness. The laminated base materials thus obtained were subjected to evaluations of draw-down and plane fluidity. The results are presented in Table 7.

Comparative Examples 9 and 10

The prepreg 1 obtained in Production Example 1 was cut out into a size of 1240 mm×940 mm, and the prepreg was processed as illustrated in FIG. 5 using a cutting plotter (manufactured by Laserck Corp., product name: L-2500) to obtain slitted prepregs 26 and 30, respectively. Meanwhile, the parameters required for the processing of the slitted prepregs 26 and 30, and the sum totals la of the cutting lengths in an area of 1 m² in a plan view of the prepregs are presented in Table 8, respectively. In the slitted prepregs 26 and 30 thus obtained, slipping of prepreg fragments did not occur in any of the processes for processing, conveyance, lamination and the like.

Sixteen layers of each of the slitted prepregs 26 and 30 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, quasi-laminated base materials 31 and 35 were obtained.

Each of the quasi-laminated base materials 31 and 35 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 31 and 35 were obtained.

The laminated base materials 31 and 35 thus obtained did not have fiber meandering, with the reinforcement fibers evenly flowing to the edges, did not have warpage, and maintained satisfactory external appearance and smoothness. The laminated base materials thus obtained were subjected to an evaluation of draw-down. The results are presented in Table 8.

Examples 23 and 25

The prepreg 1 obtained in Production Example 1 was cut out into a size of 1240 mm×940 mm, and the prepreg was processed as illustrated in FIG. 4 using a cutting plotter (manufactured by Laserck Corp., product name: L-2500) to obtain slitted prepregs 27 and 29, respectively. Meanwhile, the parameters required for the processing of the slitted prepregs 27 and 29, and the sum totals la of the cutting lengths in an area of 1 m² in a plan view of the prepregs are presented in Table 8, respectively. In the slitted prepregs 27 and 29 thus obtained, slipping of prepreg fragments did not occur in any of the processes for processing, conveyance, lamination and the like.

Sixteen layers of each of the slitted prepregs 27 and 29 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, quasi-laminated base materials 27 and 29 were obtained.

Each of the quasi-laminated base materials 32 and 34 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus laminated base materials 32 and 34 were obtained.

The laminated base materials 32 and 34 thus obtained did not have fiber meandering, with the reinforcement fibers evenly flowing to the edges, did not have warpage, and maintained satisfactory external appearance and smoothness. The laminated base materials thus obtained were subjected to an evaluation of draw-down. The results are presented in Table 8.

Example 24

The prepreg 1 obtained in Production Example 1 was cut out into a size of 1240 mm×940 mm, and the prepreg was processed as illustrated in FIG. 3 using a cutting plotter (manufactured by Laserck Corp., product name: L-2500) to obtain a slitted prepreg 28. Meanwhile, the parameters required for the processing of the slitted prepreg 28, and the sum total 1a of the cutting lengths in an area of 1 m² in a plan view of the prepreg are presented in Table 8. In the slitted prepreg 28 thus obtained, slipping of prepreg fragments did not occur in any of the processes for processing, conveyance, lamination and the like.

Sixteen layers of the slitted prepreg 28 thus obtained were laminated such that the fiber axis direction was $[(0/45/90/-45)_S]_2$, and the direction of slits was $[(-45/0/45/90)_S]_2$, and then the laminate was spot welded using an ultrasonic welding machine (manufactured by Emerson Japan, Ltd., product name: 2000LPt). Thus, a quasi-laminated base material 33 was obtained.

The quasi-laminated base material 33 thus obtained was disposed inside a seal case mold having a depth of 1.5 mm, the mold was introduced into a multistage press machine having the heating disc preheated to 200° C., and the quasi-laminated base material was subjected to heating and pressurization for 10 minutes at a pressure of 0.30 MPa. Subsequently, cooling and pressurized pressing was performed for 3 minutes at a pressure of 1.0 MPa, and thus a laminated base material 33 was obtained.

The laminated base material 33 thus obtained did not have fiber meandering, with the reinforcement fibers evenly flowing to the edges, did not have warpage, and maintained satisfactory external appearance and smoothness. The laminated base material thus obtained was subjected to an evaluation of draw-down. The results are presented in Table 8.

TABLE 1

| | | | Example/Comparative Example | | |
|---|---|---|---|---|---|
| | | | Comparative Example 1 | Comparative Example 2 | Comparative Example 3 |
| Form | Name | | Prepreg 1 | Slitted prepreg 1 | Slitted prepreg 2 |
| Prepreg | Resin | | Acid-modified PP | Acid-modified PP | PA6 |
| | Thickness | (mm) | 0.12 | 0.12 | 0.12 |
| | Vf | (%) | 33 | 33 | 33 |
| | Density | (g/cm³) | 1.21 | 1.21 | 1.36 |
| | Length of reinforcement fibers A | (mm) | UD | 25 | 25 |
| | Proportion between reinforcement fibers B and sheet length in reinforcement fiber alignment direction of prepreg (length of reinforcement fibers B/sheet length) | (%) | | Conventional slit | Conventional slit |
| | Width Wn of band section having reinforcement fibers B | (mm) | | | |
| | Width Wp of space between band sections formed from reinforcement fibers B | (mm) | | | |
| | Proportion S occupied by band sections contAining reinforcement fibers B in prepreg | (%) | | | |
| | Number of contact points between reinforcement fibers B and edges in sheet length direction of prepreg | (sites) | | | |
| | Slit angle q | (°) | | 45 | 45 |
| | Sum total 1a of cutting lengths per 1 m² | (m/m²) | | 56.6 | 56.6 |

TABLE 1-continued

| | | | Example/Comparative Example | | |
|---|---|---|---|---|---|
| | | | Comparative Example 1 | Comparative Example 2 | Comparative Example 3 |
| | Name | | Laminated base material 1 | Laminated base material 2 | Laminated base material 3 |
| Laminated base material | Number of sheets of prepreg of invention included in aaminated base material | (sheets) | 0 | 0 | |
| | Thickness | (mm) | 1.8 | 1.8 | 1.8 |
| | Draw-down | (mm) | A (2.3) | D (17.6) | D (18.7) |
| | Rib fluidity (100 t molding) | | D | A | — |
| | Rib fluidity (60 t molding) | | D | A | — |
| | Plane fluidity | (times) | D (Non-uniform flow) | A (2.88) | — |
| | Frame molding | | — | — | B |

TABLE 2

| | | | Example/Comparative Example | | | | |
|---|---|---|---|---|---|---|---|
| | | | Example 1 | Example 2 | Example 3 | Example 4 | Example 5 |
| Form | Name | | Slitted prepreg 3 | Slitted prepreg 4 | Slitted prepreg 5 | Slitted prepreg 6 | Slitted prepreg 7 |
| Prepreg | Resin | | PA6 | Acid-modified PP | Acid-modified PP | Acid-modified PP | Acid-modified PP |
| | Thickness | (mm) | 0.12 | 0.12 | 0.12 | 0.12 | 0.12 |
| | Vf | (%) | 33 | 33 | 33 | 33 | 33 |
| | Density | (g/cm$^3$) | 1.36 | 1.21 | 1.21 | 1.21 | 1.21 |
| | Length of reinforcement fibers A | (mm) | 25 | 25 | 25 | 25 | 25 |
| | Proportion between reinforcement fibers B and sheet length in reinforcement fiber alignment direction of prepreg (length of reinforcement fibers B/sheet length) | (%) | 100 | 100 | 100 | 100 | 100 |
| | Width Wn of band section having reinforcement fibers B | (mm) | 3 | 2 | 3 | 5 | 10 |
| | Width Wp of space between band sections formed from reinforcement fibers B | (mm) | 27 | 28 | 27 | 25 | 20 |
| | Proportion S occupied by band sections contAining reinforcement fibers B in prepreg | (%) | 10.0% | 6.7% | 10.0% | 16.7% | 33.3% |
| | Number of contact points between reinforcement fibers B and edges in sheet length direction of prepreg | (sites) | 2 | 2 | 2 | 2 | 2 |
| | Slit angle q | (°) | 45 | 45 | 45 | 45 | 45 |
| | Sum total 1a of cutting lengths per 1 m$^2$ | (m/m$^2$) | 51.5 | 53.2 | 51.5 | 48.1 | 39.6 |
| | Name | | Laminated base material 4 | Laminated base material 5 | Laminated base material 6 | Laminated base material 7 | Laminated base material 8 |
| Laminated base material | Number of sheets of prepreg of invention included in aaminated base material | (sheets) | 8 | 8 | 8 | 8 | 8 |
| | Thickness | (mm) | 1.8 | 1.8 | 1.8 | 1.8 | 1.8 |
| | Draw-down | (mm) | A (3.9) | A (4.5) | A (5) | A (3.3) | A (3.6) |
| | Rib fluidity (100 t molding) | | — | A | A | A | A |
| | Rib fluidity (60 t molding) | | — | A | A | B | C |
| | Plane fluidity | (times) | — | A (2.72) | A (2.57) | A (2.55) | A (2.6) |
| | Frame molding | | A | — | — | — | — |

TABLE 3

| Form | Name | | Example/Comparative Example | | | |
|---|---|---|---|---|---|---|
| | | | Example 6 | Example 7 | Example 8 | Example 9 |
| | | | Slitted prepreg 4 | Slitted prepreg 4 | Slitted prepreg 4 | Slitted prepreg 4 |
| Prepreg | Resin | | Acid-modified PP | Acid-modified PP | Acid-modified PP | Acid-modified PP |
| | Thickness | (mm) | 0.12 | 0.12 | 0.12 | 0.12 |
| | Vf | (%) | 33 | 33 | 33 | 33 |
| | Density | (g/cm³) | 1.21 | 1.21 | 1.21 | 1.21 |
| | Length of reinforcement fibers A | (mm) | 25 | 25 | 25 | 25 |
| | Proportion between reinforcement fibers B and sheet length in reinforcement fiber alignment direction of prepreg (length of reinforcement fibers B/sheet length) | (%) | 100 | 100 | 100 | 100 |
| | Width Wn of band section having reinforcement fibers B | (mm) | 2 | 2 | 2 | 2 |
| | Width Wp of space between band sections formed from reinforcement fibers B | (mm) | 28 | 28 | 28 | 28 |
| | Proportion S occupied by band sections contAining reinforcement fibers B in prepreg | (%) | 6.7% | 6.7% | 6.7% | 6.7% |
| | Number of contact points between reinforcement fibers B and edges in sheet length direction of prepreg | (sites) | 2 | 2 | 2 | 2 |
| | Slit angle q | (°) | 45 | 45 | 45 | 45 |
| | Sum total 1a of cutting lengths per 1 m² | (m/m²) | 53.2 | 53.2 | 53.2 | 53.2 |
| | Name | | Laminated base material 9 | Laminated base material 10 | Laminated base material 11 | Laminated base material 12 |
| Laminated base material | Number of sheets of prepreg of invention included in aaminated base material | (sheets) | 4 | 4 | 4 | 1 |
| | Thickness | (mm) | 1.8 | 1.8 | 1.8 | 1.8 |
| | Draw-down | (mm) | B (6.4) | B (5.5) | A (4.7) | C (10.2) |
| | Rib fluidity (100 t molding) | | — | — | — | — |
| | Rib fluidity (60 t molding) | | — | — | — | — |
| | Plane fluidity | (times) | — | — | — | — |
| | Frame molding | | — | — | — | — |

TABLE 4

| Form | Name | | Example/Comparative Example | | | | |
|---|---|---|---|---|---|---|---|
| | | | Comparative Example 4 | Example 10 | Example 11 | Example 12 | Example 13 |
| | | | Slitted prepreg 8 | Slitted prepreg 9 | Slitted prepreg 10 | Slitted prepreg 11 | Slitted prepreg 12 |
| Prepreg | Resin | | Acid-modified PP | Acid-modified PP | Acid-modified PP | Acid-modified PP | Acid-modified PP |
| | Thickness | (mm) | 0.12 | 0.12 | 0.12 | 0.12 | 0.12 |
| | Vf | (%) | 33 | 33 | 33 | 33 | 33 |
| | Density | (g/cm³) | 1.21 | 1.21 | 1.21 | 1.21 | 1.21 |
| | Length of reinforcement fibers A | (mm) | 25 | 25 | 25 | 25 | 25 |
| | Proportion between reinforcement fibers B and sheet length in reinforcement fiber alignment direction of prepreg (length of reinforcement fibers B/sheet length) | (%) | 100 | 100 | 100 | 100 | 100 |
| | Width Wn of band section having reinforcement fibers B | (mm) | 0.4 | 1 | 2 | 5 | 10 |
| | Width Wp of space between band sections formed from reinforcement fibers B | (mm) | 30 | 30 | 30 | 30 | 30 |
| | Proportion S occupied by band sections contAining reinforcement fibers B in prepreg | (%) | 1.3% | 3.2% | 6.3% | 14.3% | 25.0% |
| | Number of contact points between reinforcement fibers B and edges in sheet length direction of prepreg | (sites) | 2 | 2 | 2 | 2 | 2 |
| | Slit angle q | (°) | 45 | 45 | 45 | 45 | 45 |
| | Sum total 1a of cutting lengths per 1 m² | (m/m²) | 55.9 | 54.9 | 53.2 | 48.1 | 39.6 |

TABLE 4-continued

| | | | Comparative Example 4 | Example 10 | Example 11 | Example 12 | Example 13 |
|---|---|---|---|---|---|---|---|
| | Name | | Laminated base material 13 | Laminated base material 14 | Laminated base material 15 | Laminated base material 16 | Laminated base material 17 |
| Laminated base material | Number of sheets of prepreg of invention included in aaminated base material | (sheets) | 16 | 16 | 16 | 16 | 16 |
| | Thickness | (mm) | 1.8 | 1.8 | 1.8 | 1.8 | 1.8 |
| | Draw-down | (mm) | D (20.1) | B (8.8) | B (6.0) | B (5.5) | A (4.0) |
| | Rib fluidity (100 t molding) | | A | A | A | A | C |
| | Rib fluidity (60 t molding) | | A | A | A | B | C |
| | Plane fluidity | (times) | — | A (2.8) | — | — | — |
| | Frame molding | | — | — | — | — | — |

TABLE 5

| | | | Example 14 | Example 15 | Example 16 | Example 17 |
|---|---|---|---|---|---|---|
| Form | Name | | Slitted prepreg 13 | Slitted prepreg 14 | Slitted prepreg 15 | Slitted prepreg 16 |
| Prepreg | Resin | | Acid-modified PP | Acid-modified PP | Acid-modified PP | Acid-modified PP |
| | Thickness | (mm) | 0.12 | 0.12 | 0.12 | 0.12 |
| | Vf | (%) | 33 | 33 | 33 | 33 |
| | Density | (g/cm$^3$) | 1.21 | 1.21 | 1.21 | 1.21 |
| | Length of reinforcement fibers A | (mm) | 25 | 25 | 25 | 25 |
| | Proportion between reinforcement fibers B and sheet length in reinforcement fiber alignment direction of prepreg (length of reinforcement fibers B/sheet length) | (%) | 100 | 100 | 100 | 100 |
| | Width Wn of band section having reinforcement fibers B | (mm) | 1 | 1 | 1 | 1 |
| | Width Wp of space between band sections formed from reinforcement fibers B | (mm) | 5 | 15 | 60 | 90 |
| | Proportion S occupied by band sections contAining reinforcement fibers B in prepreg | (%) | 16.7% | 6.3% | 1.6% | 1.1% |
| | Number of contact points between reinforcement fibers B and edges in sheet length direction of prepreg | (sites) | 2 | 2 | 2 | 2 |
| | Slit angle q | (°) | 45 | 45 | 45 | 45 |
| | Sum total 1a of cutting lengths per 1 m$^2$ | (m/m$^2$) | 45.4 | 53 | 55.8 | 56 |
| | Name | | Laminated base material 18 | Laminated base material 19 | Laminated base material 20 | Laminated base material 21 |
| Laminated base material | Number of sheets of prepreg of invention included in aaminated base material | (sheets) | 16 | 16 | 16 | 16 |
| | Thickness | (mm) | 1.8 | 1.8 | 1.8 | 1.8 |
| | Draw-down | (mm) | A (3.3) | B (7.0) | B (9.4) | C (14.0) |
| | Rib fluidity (100 t molding) | | A | A | A | A |
| | Rib fluidity (60 t molding) | | B | A | A | A |
| | Plane fluidity | (times) | — | — | — | — |
| | Frame molding | | — | — | — | — |

TABLE 6

|  |  |  | Comparative Example 5 | Example 18 | Example 19 | Comparative Example 6 |
|---|---|---|---|---|---|---|
| Form | Name |  | Slitted prepreg 17 | Slitted prepreg 18 | Slitted prepreg 19 | Slitted prepreg 20 |
| Prepreg | Resin |  | Acid-modified PP | Acid-modified PP | Acid-modified PP | Acid-modified PP |
|  | Thickness | (mm) | 0.12 | 0.12 | 0.12 | 0.12 |
|  | Vf | (%) | 33 | 33 | 33 | 33 |
|  | Density | (g/cm$^3$) | 1.21 | 1.21 | 1.21 | 1.21 |
|  | Length of reinforcement fibers A | (mm) | 6 | 12.5 | 50 | 75 |
|  | Proportion between reinforcement fibers B and sheet length in reinforcement fiber alignment direction of prepreg (length of reinforcement fibers B/sheet length) | (%) | 100 | 100 | 100 | 100 |
|  | Width Wn of band section having reinforcement fibers B | (mm) | 1 | 1 | 1 | 1 |
|  | Width Wp of space between band sections formed from reinforcement fibers B | (mm) | 30 | 30 | 30 | 30 |
|  | Proportion S occupied by band sections contAining reinforcement fibers B in prepreg | (%) | 3.2% | 3.2% | 3.2% | 3.2% |
|  | Number of contact points between reinforcement fibers B and edges in sheet length direction of prepreg | (sites) | 2 | 2 | 2 | 2 |
|  | Slit angle q | (°) | 45 | 45 | 45 | 45 |
|  | Sum total 1a of cutting lengths per 1 m$^2$ | (m/m$^2$) | 228.6 | 109.7 | 27.4 | 18.3 |
|  | Name |  | Laminated base material 22 | Laminated base material 23 | Laminated base material 24 | Laminated base material 25 |
| Laminated base material | Number of sheets of prepreg of invention included in aaminated base material | (sheets) | — | 16 | 16 | 16 |
|  | Thickness | (mm) | — | 1.8 | 1.8 | 1.8 |
|  | Draw-down | (mm) | Processing infeasible unevaluated | B (6.4) | A (4.7) | A (4.4) |
|  | Rib fluidity (100 t molding) |  |  | — | — | — |
|  | Rib fluidity (60 t molding) |  |  | — | — | — |
|  | Plane fluidity | (times) |  | A (3.0) | B (2.4) | C (1.8) |
|  | Frame molding |  |  | — | — | — |

TABLE 7

|  |  |  | Comparative Example 7 | Example 20 | Example 21 | Example 22 | Comparative Example 8 |
|---|---|---|---|---|---|---|---|
| Form | Name |  | Slitted prepreg 21 | Slitted prepreg 22 | Slitted prepreg 23 | Slitted prepreg 24 | Slitted prepreg 25 |
| Prepreg | Resin |  | Acid-modified PP | Acid-modified PP | Acid-modified PP | Acid-modified PP | Acid-modified PP |
|  | Thickness | (mm) | 0.12 | 0.12 | 0.12 | 0.12 | 0.12 |
|  | Vf | (%) | 33 | 33 | 33 | 33 | 33 |
|  | Density | (g/cm$^3$) | 1.21 | 1.21 | 1.21 | 1.21 | 1.21 |
|  | Length of reinforcement fibers A | (mm) | 25 | 25 | 25 | 25 | 25 |
|  | Proportion between reinforcement fibers B and sheet length in reinforcement fiber alignment direction of prepreg (length of reinforcement fibers B/sheet length) | (%) | 100 | 100 | 100 | 100 | 100 |
|  | Width Wn of band section having reinforcement fibers B | (mm) | 1 | 1 | 1 | 1 | 1 |
|  | Width Wp of space between band sections formed from reinforcement fibers B | (mm) | 30 | 30 | 30 | 30 | 30 |
|  | Proportion S occupied by band sections contAining reinforcement fibers B in prepreg | (%) | 3.2% | 3.2% | 3.2% | 3.2% | 3.2% |

TABLE 7-continued

| | | | Example/Comparative Example | | | | |
|---|---|---|---|---|---|---|---|
| | | | Comparative Example 7 | Example 20 | Example 21 | Example 22 | Comparative Example 8 |
| | Number of contact points between reinforcement fibers B and edges in sheet length direction of prepreg | (sites) | 2 | 2 | 2 | 2 | 2 |
| | Slit angle q | (°) | 10 | 15 | 30 | 60 | 90 |
| | Sum total 1a of cutting lengths per 1 m² | (m/m²) | 33.7 | 36.8 | 43.8 | 78.6 | ¥ |

| | Name | | Laminated base material 26 | Laminated base material 27 | Laminated base material 28 | Laminated base material 29 | Laminated base material 30 |
|---|---|---|---|---|---|---|---|
| Laminated base material | Number of sheets of prepreg of invention included in aaminated base material | (sheets) | — | 16 | 16 | 16 | 16 |
| | Thickness | (mm) | — | 1.8 | 1.8 | 1.8 | 1.8 |
| | Draw-down | (mm) | Processing infeasible | A (4.4) | B (5.4) | B (7.4) | B (7.8) |
| | Rib fluidity (100 t molding) | | Unevaluated | — | — | — | — |
| | Rib fluidity (60 t molding) | | | — | — | — | — |
| | Plane fluidity | (times) | | B (2.4) | A (2.8) | A (2.9) | D (2.9) Non-uniform flow |
| | Frame molding | | | — | — | — | — |

TABLE 8

| | | | Example/Comparative Example | | | | |
|---|---|---|---|---|---|---|---|
| | | | Comparative Example 9 | Example 23 | Example 24 | Example 25 | Comparative Example 10 |
| Form | Name | | Slitted prepreg 26 | Slitted prepreg 27 | Slitted prepreg 28 | Slitted prepreg 29 | Slitted prepreg 30 |
| Prepreg | Resin | | Acid-modified PP | Acid-modified PP | Acid-modified PP | Acid-modified PP | Acid-modified PP |
| | Thickness | (mm) | 0.12 | 0.12 | 0.12 | 0.12 | 0.12 |
| | Vf | (%) | 33 | 33 | 33 | 33 | 33 |
| | Density | (g/cm³) | 1.21 | 1.21 | 1.21 | 1.21 | 1.21 |
| | Length of reinforcement fibers A | (mm) | 25 | 25 | 25 | 25 | 25 |
| | Proportion between reinforcement fibers B and sheet length in reinforcement fiber alignment direction of prepreg (length of reinforcement fibers B/sheet length) | (%) | 70 | 70 | 70 | 50 | 50 |
| | Width Wn of band section having reinforcement fibers B | (mm) | 1 | 1 | 1 | 1 | 1 |
| | Width Wp of space between band sections formed from reinforcement fibers B | (mm) | 30 | 30 | 30 | 30 | 30 |
| | Proportion S occupied by band sections contAining reinforcement fibers B in prepreg | (%) | 3.2% | 3.2% | 3.2% | 3.2% | 3.2% |
| | Number of contact points between reinforcement fibers B and edges in sheet length direction of prepreg | (sites) | 0 | 1 | 1 | 1 | 0 |
| | Slit angle q | (°) | 45 | 45 | 45 | 45 | 45 |
| | Sum total 1a of cutting lengths per 1 m³ | (m/m²) | 54.9 | 54.9 | 54.9 | 54.9 | 54.9 |

| | Name | | Laminated base material 31 | Laminated base material 32 | Laminated base material 33 | Laminated base material 34 | Laminated base material 35 |
|---|---|---|---|---|---|---|---|
| Laminated base material | Number of sheets of prepreg of invention included in aaminated base material | (sheets) | 16 | 16 | 16 | 16 | 16 |
| | Thickness | (mm) | 1.8 | 1.8 | 1.8 | 1.8 | 1.8 |
| | Draw-down | (mm) | D (17.8) | C (14.4) | C (13.4) | C (14.5) | D (19.3) |
| | Rib fluidity (100 t molding) | | — | — | — | — | — |
| | Rib fluidity (60 t molding) | | — | — | — | — | — |
| | Plane fluidity | (times) | — | — | — | — | — |
| | Frame molding | | — | — | — | — | — |

INDUSTRIAL APPLICABILITY

The present invention can provide a prepreg which suppresses draw-down at the time of preheating for stamping molding, has excellent handleability, and has excellent moldability into a complicated shape, and can provide a laminated base material thereof. Thus, the present invention is industrially highly useful.

EXPLANATIONS OF LETTERS OR NUMERALS

1: slit
2: reinforced fiber that is not cut off over the length from one side to the other side of a sheet-shaped prepreg
3: band section containing reinforced fibers B
4: band section formed from reinforced fibers A cut by slits
L: length of reinforced fibers cut by slits
l: slit length
θ: angle formed by a slit and a reinforcement fiber in a plan view
Wp: pitch width in a plan view of a band section containing reinforced fibers that are not cut off over the length from one side to the other side of a sheet-shaped prepreg
Wn: width in a plan view of a band section containing reinforced fibers that are not cut off over the length from one side to the other side of a sheet-shaped prepreg, the width being in a direction perpendicular to the fiber direction
Ws: projection length of a slit projected in the perpendicular direction of reinforced fibers in a plan view

The invention claimed is:

1. A prepreg comprising a resin and unidirectionally aligned reinforcement fibers,
wherein
the prepreg is sheet-shaped;
the prepreg has slits with a depth capable of cutting off the reinforcement fibers;
the reinforcement fibers of the prepreg comprise reinforcement fibers A cut by the slits to a length of 10 to 50 mm; and reinforcement fibers B having a length equivalent to 50% or more of the sheet length of the prepreg in the alignment direction of the reinforcement fibers;
the surface area in a plan view of a band section containing the reinforcement fibers B is from 1.4% to 35.0% relative to the total surface in a plan view of the prepreg,
at least one end of the reinforcement fibers B is positioned at an edge of the prepreg in the alignment direction of the reinforcement fibers, and
at least two band sections formed from the reinforcement fibers A cut by the slits and band sections containing the reinforcement fibers B are alternately arranged in a repeating pattern over the entire surface of the prepreg, and
the prepeg comprises at least one band section containing the reinforcement fibers B between two band sections formed from the reinforcement fibers A cut by the slits.

2. The prepreg according to claim 1, wherein a band section containing the reinforcement fibers B is disposed between one band section formed from the reinforcement fibers A cut by the slits and another band section formed from the reinforcement fibers A cut by the slits.

3. The prepreg according to claim 1, wherein a width Wn of a band section containing the reinforcement fibers B is from 0.5 mm to 10.0 mm, and a distance Wp between one band section containing the reinforcement fibers B and another band section containing the reinforcement fibers B, is from 5 mm to 150 mm.

4. The prepreg according to claim 1, wherein widths Wn of the band sections containing the reinforcement fibers B are all of the same length.

5. The prepreg according to claim 1, wherein the reinforcement fibers B are reinforcement fibers that are not cut over the length from one side to the other side of the prepreg.

6. The prepreg according to claim 1, wherein one side of the prepreg is parallel to the alignment direction of the reinforcement fibers.

7. The prepreg according to claim 1, wherein the sum total of the cutting lengths formed by the slits in a surface area in a plan view of 1 $m^2$ of the prepreg, is from 20 m to 150 m.

8. The prepreg according to claim 1, wherein an angle formed by the slits and the reinforcement fibers is from 30° to 60°.

9. The prepreg according to claim 1, wherein a thickness of the prepreg is from 50 μm to 200 μm.

10. The prepreg according to claim 1, wherein the reinforcement fibers are carbon fibers.

11. The prepreg according to claim 1, wherein the resin that forms the prepreg is a thermoplastic resin.

12. The prepreg according to claim 1, wherein at least one side of the prepreg is from 500 mm to 2000 mm in length.

13. A laminated base material formed by laminating plural sheets of prepregs, wherein the laminated base material comprises at least one sheet of the prepreg according to claim 1.

14. The laminated base material according to claim 13, further comprising at least one layer which is formed from a thermoplastic resin and does not contain the reinforcement fibers.

15. The laminated base material according to claim 13, wherein a volume fraction of the reinforcement fibers included in the laminated base material is from 15% by volume to 55% by volume relative to the total volume of the laminated base material.

16. A molded article obtained by molding the laminated base material according to claim 13 by a process comprising heating and pressurization.

* * * * *